(12) United States Patent
Farrar et al.

(10) Patent No.: US 12,349,749 B2
(45) Date of Patent: Jul. 8, 2025

(54) BUCKLE AND STRAP ARRANGEMENTS

(71) Applicant: Circle 3 Creative, LLC, Bozeman, MT (US)

(72) Inventors: Tim Farrar, Bozeman, MT (US); Jeff Vermillion, Bozeman, MT (US)

(73) Assignee: Circle 3 Creative, LLC, Bozeman, MT (US)

( * ) Notice: Subject to any disclaimer, the term of this patent is extended or adjusted under 35 U.S.C. 154(b) by 268 days.

(21) Appl. No.: 17/973,445

(22) Filed: Oct. 25, 2022

(65) Prior Publication Data

US 2023/0148567 A1 May 18, 2023

Related U.S. Application Data

(63) Continuation-in-part of application No. 17/510,303, filed on Oct. 25, 2021, now Pat. No. 12,268,194.

(60) Provisional application No. 63/105,097, filed on Oct. 23, 2020.

(51) Int. Cl.
| | |
|---|---|
| *A41F 9/00* | (2006.01) |
| *A41F 1/00* | (2006.01) |
| *A44B 11/25* | (2006.01) |

(52) U.S. Cl.
CPC .............. *A41F 9/002* (2013.01); *A41F 1/002* (2013.01); *A44B 11/258* (2013.01)

(58) Field of Classification Search
CPC .. A41F 9/002; A41F 9/025; A41F 9/00; A41F 1/002; A44B 11/258; A44B 11/2584; A44B 11/006; A44B 11/25; Y10T 24/32; Y10T 292/11; Y10T 24/16; Y10T 24/40; Y10T 24/3401; A01K 27/001; A01K 27/00; A01K 27/003; A01K 27/002; A41D 2200/10
USPC ........................................................ 2/338, 336
See application file for complete search history.

(56) References Cited

U.S. PATENT DOCUMENTS

| | | | | |
|---|---|---|---|---|
| 5,253,394 | A * | 10/1993 | Morita | A41F 1/002 24/658 |
| 5,377,392 | A * | 1/1995 | Morita | A45C 13/1069 24/303 |
| 5,515,581 | A * | 5/1996 | Kaufmann | A45C 13/1069 24/303 |
| 7,496,994 | B1 * | 3/2009 | Headley | A44C 5/2019 24/697.2 |
| 10,874,178 | B2 * | 12/2020 | Cheng | A44B 11/2584 |
| 2012/0117764 | A1 * | 5/2012 | Wong | A44B 11/258 24/302 |
| 2016/0037879 | A1 * | 2/2016 | Qian | A41F 1/002 24/3.2 |
| 2017/0127767 | A1 * | 5/2017 | Paik | A45F 5/021 |
| 2020/0054101 | A1 * | 2/2020 | Fiedler | A44B 11/25 |
| 2020/0154804 | A1 * | 5/2020 | Huang | A44B 11/28 |

FOREIGN PATENT DOCUMENTS

WO WO-2017123265 A1 * 7/2017 ............. A41F 1/002

* cited by examiner

*Primary Examiner* — Amy Vanatta

(57) ABSTRACT

Various arrangements for different purposes are created with a strap, a flat metal buckle or catch, and a receiver. The buckle or catch and the receiver have having slotted openings to attach the element to the strap at positions which may be adjustable for fixed. A receiver post with a magnetic base engages an opening in the buckle or catch for a secure engagement of the buckle or catch with the receiver. Other arrangements are also described.

8 Claims, 30 Drawing Sheets

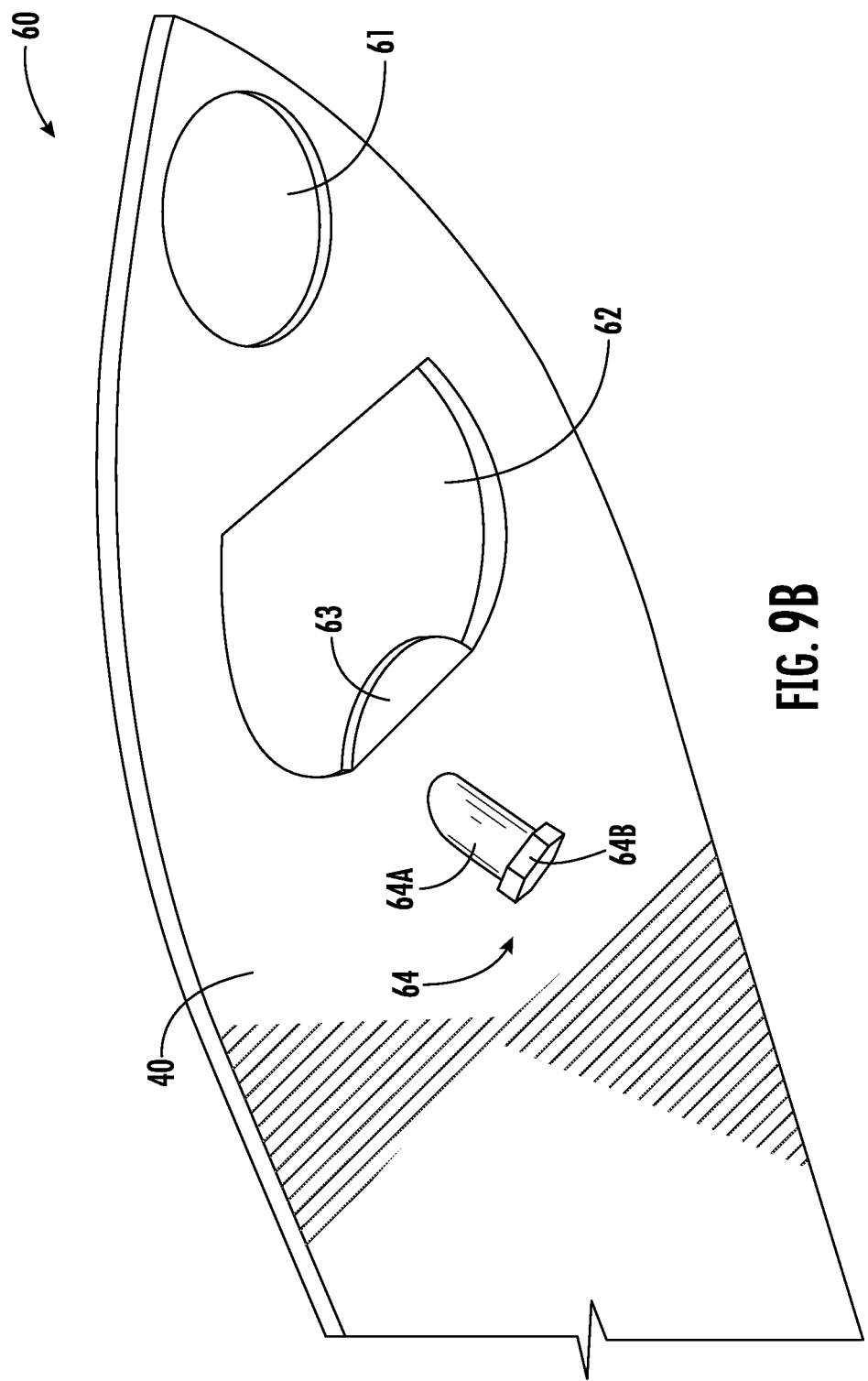

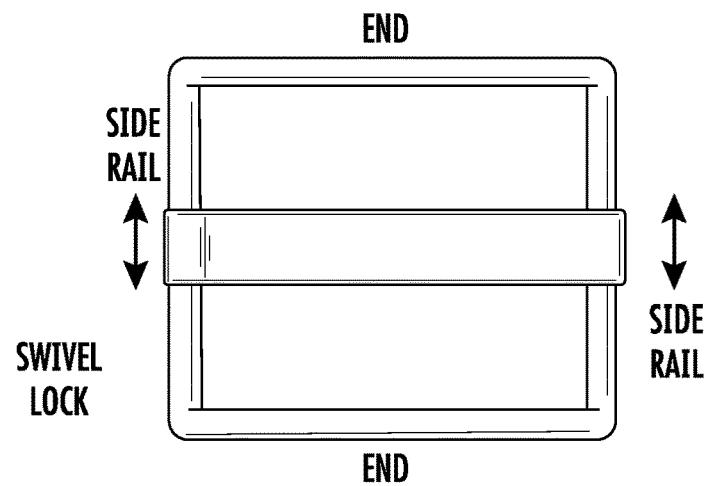
FIG. 15B
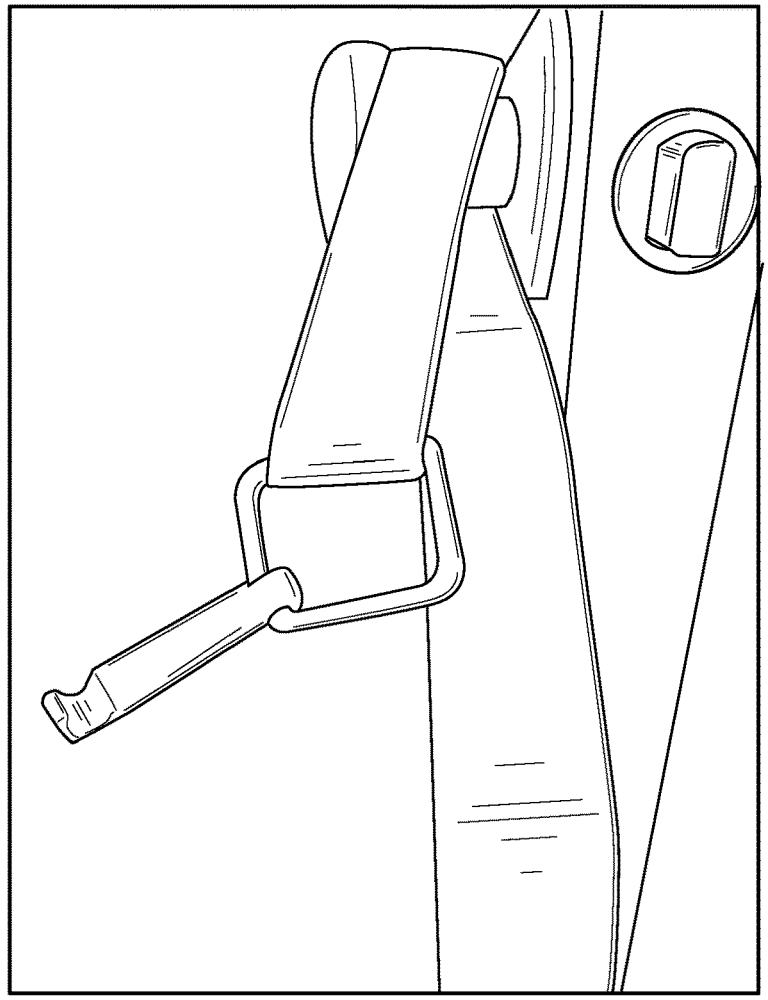
FIG. 15C(1)

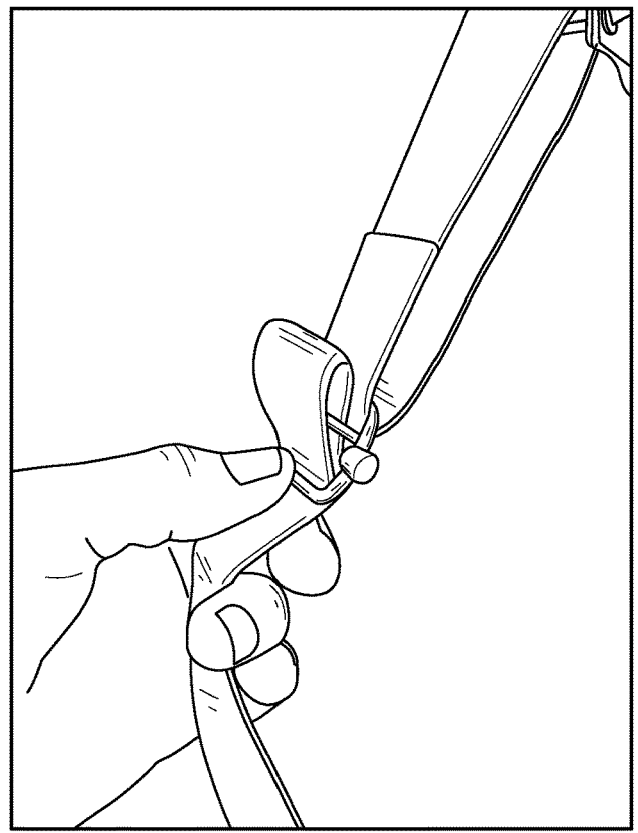
FIG. 15C(2)
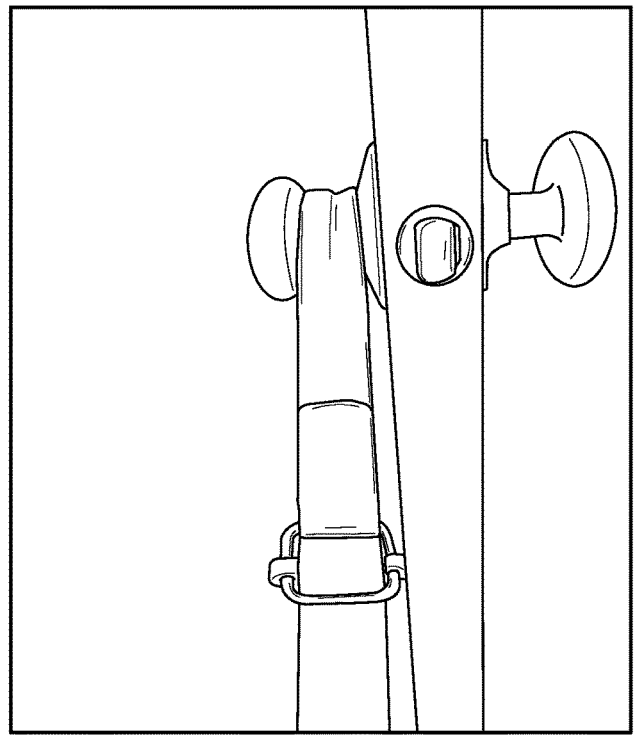
FIG. 15C(3)

BUCKLE AND STRAP ARRANGEMENTS

CROSS-REFERENCE TO RELATED APPLICATIONS

This patent application is a continuation-in-part of U.S. patent application Ser. No. 17/510,303, filed Oct. 25, 2021 (hereafter the "'303 application"), which claimed priority to U.S. Provisional Patent Application No. 63/105,097, entitled "Improved Multi-Purpose Collar/Wrap-Around Leash with Accessory Attachment Points," filed Oct. 23, 2020, all of which are incorporated by reference herein.

BACKGROUND OF THE INVENTION

This invention relates to buckles and straps which are suitable for animal collars and leashes. Furthermore, these buckles and straps are adaptable for many uses beyond collars and leashes.

Buckles and straps have been part of dog collars and leashes. The collars typically have locations for pet identification and owner contact information, and provide an attachment point for leashes, harnesses or similar restraining accessories. A new leash/collar by one of the current inventors incorporates the leash and collar into one continuous piece to allow a leash portion to be wrapped and stored around the dog collar portion, or released from the dog collar to form a handled leash. See U.S. Pat. No. 10,390,519, entitled, "Animal Restraint Device," which issued Aug. 27, 2019 to Tim Farrar (hereafter the "'519 patent"); and U.S. Design Pat. No. D844,907, entitled, "Combination Collar and Leash for an Animal," which issued Apr. 2, 2019 to Tim Farrar.

FIGS. 1A and 1B from the '519 patent show the incorporated leash/collar in an operative configuration and a storage configuration respectively. In FIG. 1A (FIG. 2 of the '519 patent) the collar of the leash/collar is wrapped around the neck of the animal, typically a dog, and the loop handle held in the hand of the owner while the leash section extends between the collar and loop handle. Neither the animal nor the owner is shown in the drawing. In FIG. 1B (FIG. 5 of the '519 patent) the leash/collar is in storage configuration with the balance of the leash/collar is wrapped around the collar on the neck of a dog. The leash/collar can also be stored in the same configuration without the animal. Buckles are used for formation of the collar and loop handle, and hook-and-loop fasteners are used to secure the leash/collar in the storage configuration.

The above-referenced '303 application describes improvements to the strength, security, and convenience for the incorporated leash/collar. The current patent application describes the advantages and uses provided by the buckles and straps, elements and combination of elements, of the leash/collars described in the '303 application beyond those of a simple leash/collar.

BRIEF SUMMARY OF THE INVENTION

The present invention provides for a belt arrangement having a strap, a buckle, and a receiver. The buckle has a flat metal body with at least one slotted opening through the flat metal body by which the buckle is attached to the strap, and a second opening through the flat metal body. The receiver has a flat body having at least one slotted opening by which the receiver is attached to the strap, and a magnetic base for a post perpendicular to the flat body, wherein the post fits through the second opening of the buckle and engages a sidewall of the second opening, and the magnetic base engages the flat metal body of the buckle, in a secure engagement of the metal buckle to the receiver. In this manner the strap between the buckle and receiver can form a belt around a wearer.

The present invention also provides for an arrangement has a strap, a buckle and a receiver. The buckle has a flat metal body with two close slotted openings through the flat metal body by which the buckle is attached to a first end of the strap at an adjustable position and the position fixed along the strap by a ladder lock with the two close slotted openings, and a second opening through the flat metal body. The receiver has a flat body having a magnetic base for a post perpendicular to the flat body and two slotted openings on either side of the post by which the receiver is adjustably attached at a position on the strap, wherein the post fits through the second opening of the buckle and engages a sidewall of the second opening, and the magnetic base engages the flat metal body of the buckle, in a secure engagement of the metal buckle to the receiver. Thus the strap between the buckle and receiver can form an adjustable loop around an object.

The present invention provides for a tool belt arrangement has a belt, a receiver, and a catch. The receiver has a flat body having a magnetic base for a post perpendicular to the flat body and two slotted openings on either side of the post by which the receiver is attached at an adjustable position on the belt. The catch has a flat metal body with a first opening through the flat metal body by which an item is attached to the catch, and a second opening through the flat metal body, wherein the receiver post fits through the second opening of the catch and engages a sidewall of the second opening, and the magnetic base engages the flat metal body of the catch, in a secure engagement of the metal buckle to the catch. The item can be hung from the belt.

The present invention provides for another tool belt arrangement having belt, a magnetic post, and a catch. The magnetic post extends perpendicularly from, and is riveted to, the belt. The catch has a flat metal body with a first opening through the flat metal body by which an item is attached to the catch, and a second opening through the flat metal body, wherein the magnetic post fits through the second opening of the catch and engages a sidewall of the second opening, in a secure engagement of the metal buckle to the catch. In this manner the item can be hung from the belt.

The present invention provides for an arrangement having a catch and a strap. The catch has a bar with first and second bar ends, and a rectangular frame with first and second frame ends connected by first and second side rails, the first bar end connected to the first side rail so that the bar capable of sliding along the first side rail, of rotating the second bar end open away from the second side rail and of rotating the second bar end closed against the second side rail. The strap has a first end attached to one frame end, the strap capable of binding around an object in a lock by a loop of the strap passing through the frame and trapping the bar and a part of the strap against the second frame end to close a pass swivel lock.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 9B shows in a perspective bottom view of the leash handle/leash re-attach assembly in FIG. 6.

FIG. 14A shows a modified webbing catch for use with a strap as a cargo strap, hammock strap and the like; FIG. 14B shows the FIG. 14A modified webbing catch in more detail; and FIG. 14C shows steps in engaging FIG. 14A modified webbing catch with a strap.

FIG. 15A shows another modified webbing catch for use with a strap as a cargo strap, hammock strap and the like; FIG. 15B shows the FIG. 15A webbing catch in more detail; and FIGS. 15C(1)-15C(3) shows steps in engaging the FIG. 15A modified webbing catch with a strap on a door knob.

DETAILED DESCRIPTION OF THE INVENTION

The incorporated leash/collar of the '519 patent has a strap which is part of the leash collar at one end, part of the leash loop handle at a second end and the intervening leash between the collar and the loop handle. In these improvements of the incorporated leash/collar the leash/collar strap is formed with different characteristics. In one embodiment of the present invention the leash/collar strap is constructed with a minimal stretch material, such as a webbing weave of artificial fibers or natural fibers. Depending upon the fibers and the weave, the leash/collar strap can be made non-stretchable, or with minimal stretch. Leather can also be used if the dimensions of the leash/collar strap and the particular leather skin provides for a minimal stretch.

With the strap of minimal stretch, an improved incorporated leash/collar is provided with a non-internal low-profile buckle slide attached at one end of the leash/collar strap, a flat end buckle attached to the other end of the collar/leash strap, and an adjustable receiver element on the leash/collar strap between the two buckles.

Figure 1A:
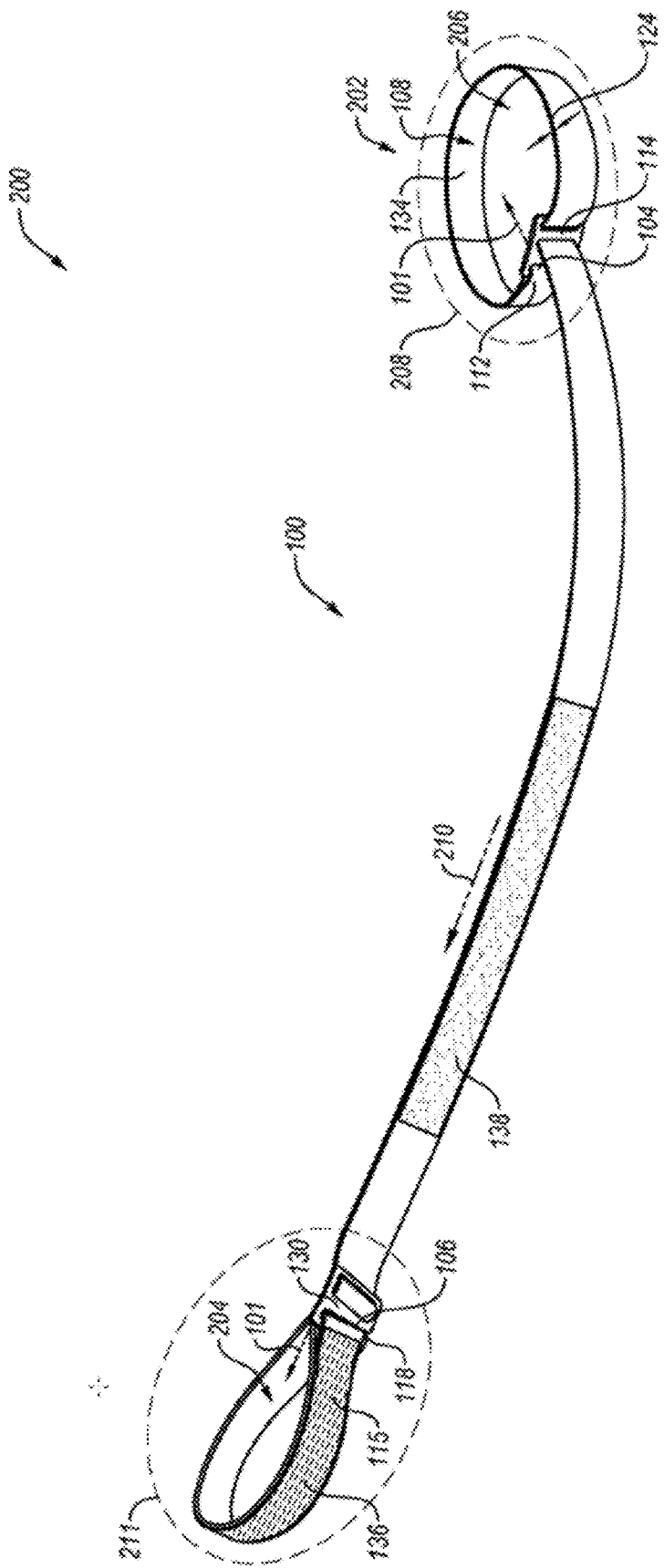
FIG. 1A shows an incorporated leash/collar in an operative configuration.
Figure 1B:
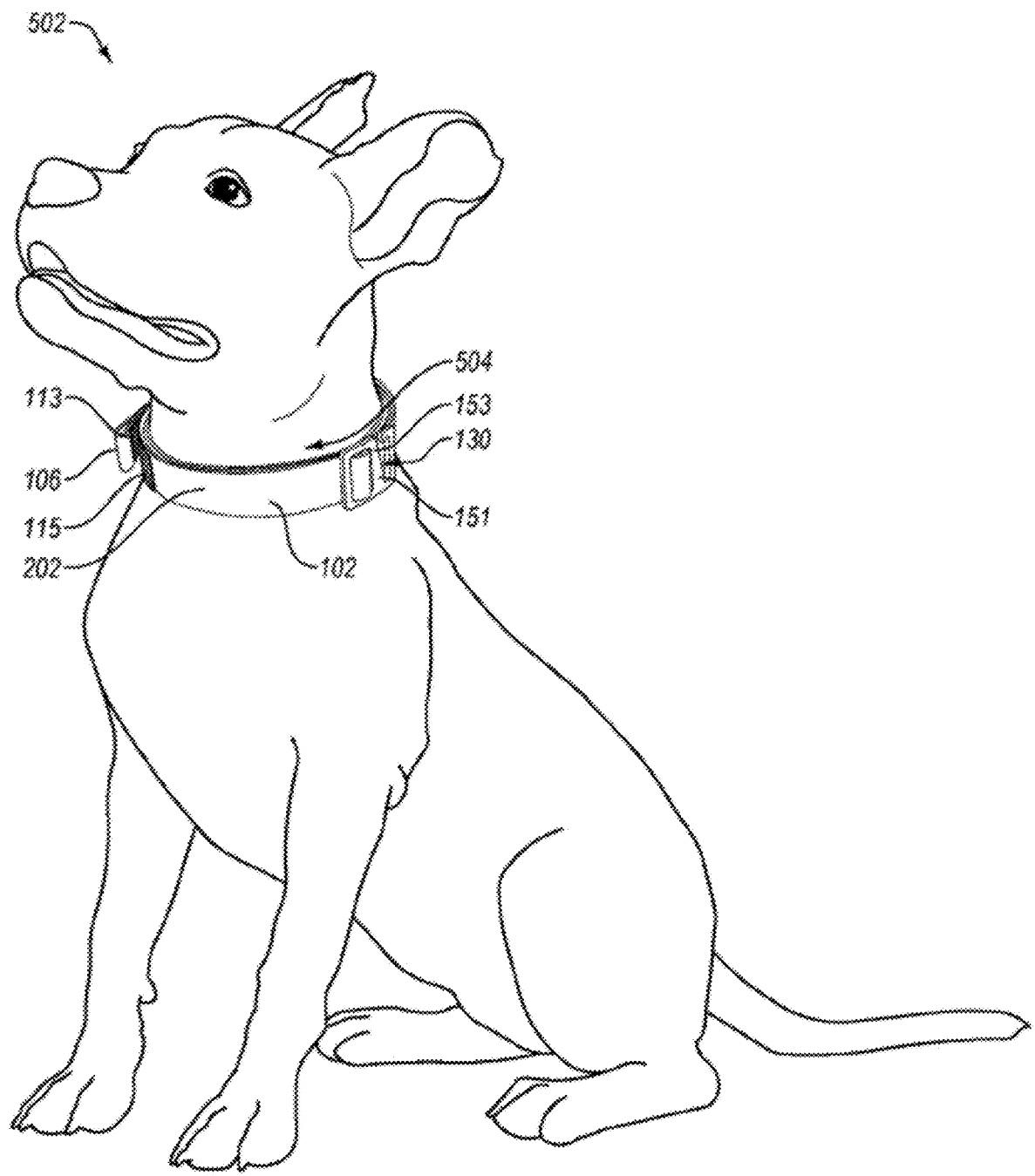
FIG. 1B illustrates the FIG. 1A incorporated leash/collar in a stored configuration.
Figure 2:
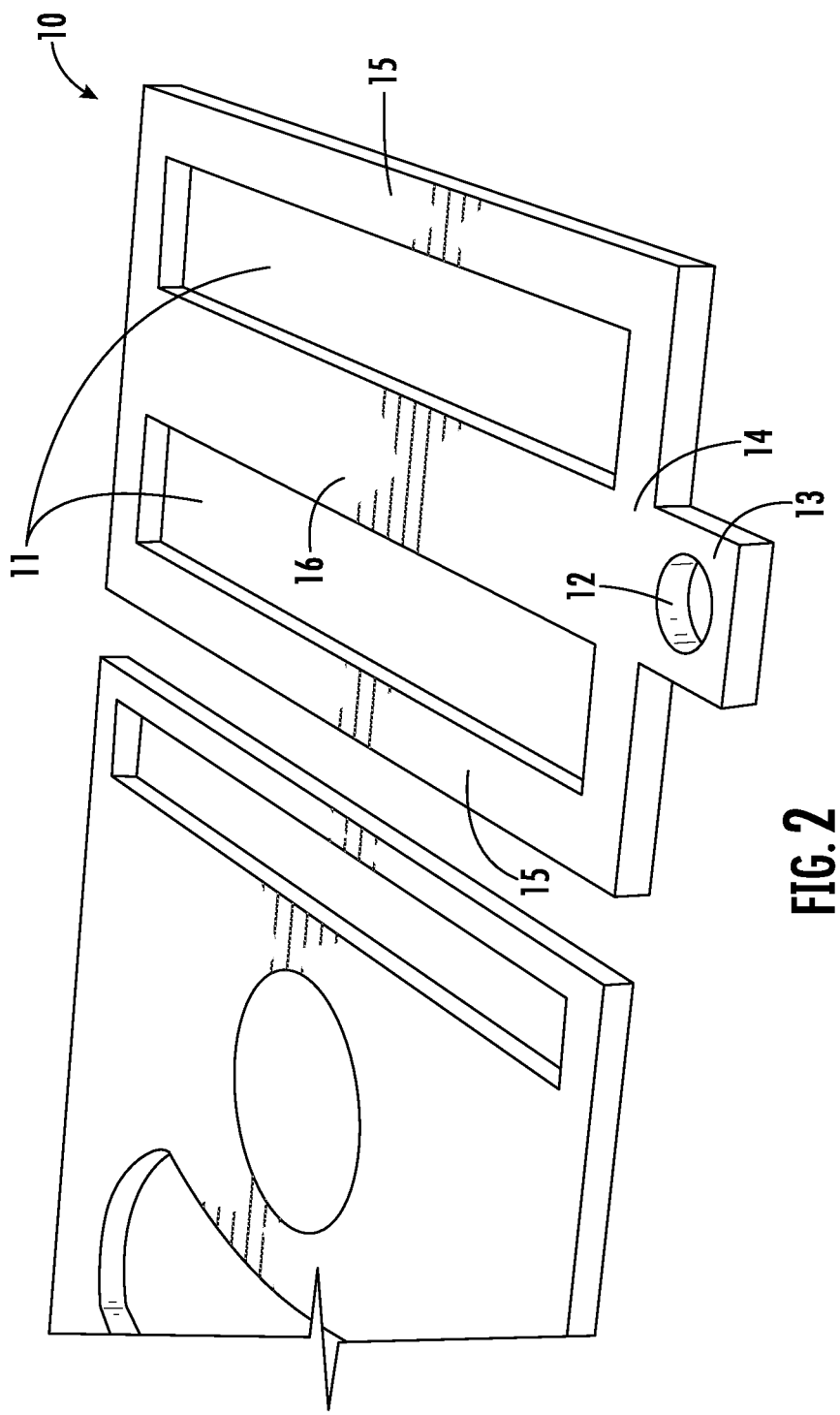
FIG. 2 shows a perspective view of an internal low profile buckle slide of an improved incorporated leash/collar according to one embodiment of the present invention.

FIGS. 2-5B illustrate the buckle and strap components of such an improved incorporated leash/collar. FIG. 2 illustrates a non-internal low-profile buckle slide 10, preferably made of metal, though a strong anti-wear material, such as certain plastics or reinforced carbon fiber material, might be used. A frame 14 of the buckle slide 10 has a post 16 separating two openings 11 at the two ends 15 of the buckle slide 10. The openings 11 are slotted and shaped to engage the webbing material of the leash/collar strap. One end (the animal or bitter end) of the leash/collar strap is attached to an end 15 of the buckle slide 10 by simply gluing or fusing the end of the leash/collar strap to the end 15 or looping the leash/collar strap end though the appropriate opening 11 and around the buckle slide end 15, and fixing the strap end back to the leash/collar strap.

To form the base collar around the neck of the animal, the other end of the leash/collar strap the leash/collar strap is passed through the same slotted opening 11 attached to the bitter end (animal end) and then through the second slotted opening 11. The leash/collar strap from the second opening 11 forms a leash with an extended tag loop (the leash and handle) from the remaining strap. To adjust or remove the collar from the animal, the user simply feeds the leash/collar strap slack through the openings 11 of the buckle slide 10 until the desired collar size is created. The buckle slide 10 also has an extended leg 13 with a hole 12 to receive a traditional dog tag.

Figure 3A:
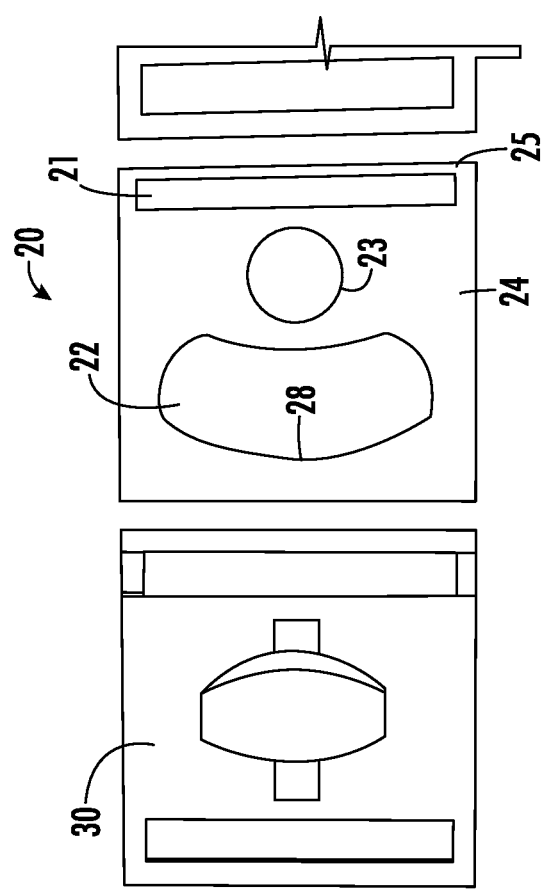
FIG. 3A shows a top view of an adjustable receiver and a flat end buckle which work with the FIG. 2 buckle slide in one embodiment of the present invention.
Figure 3B:
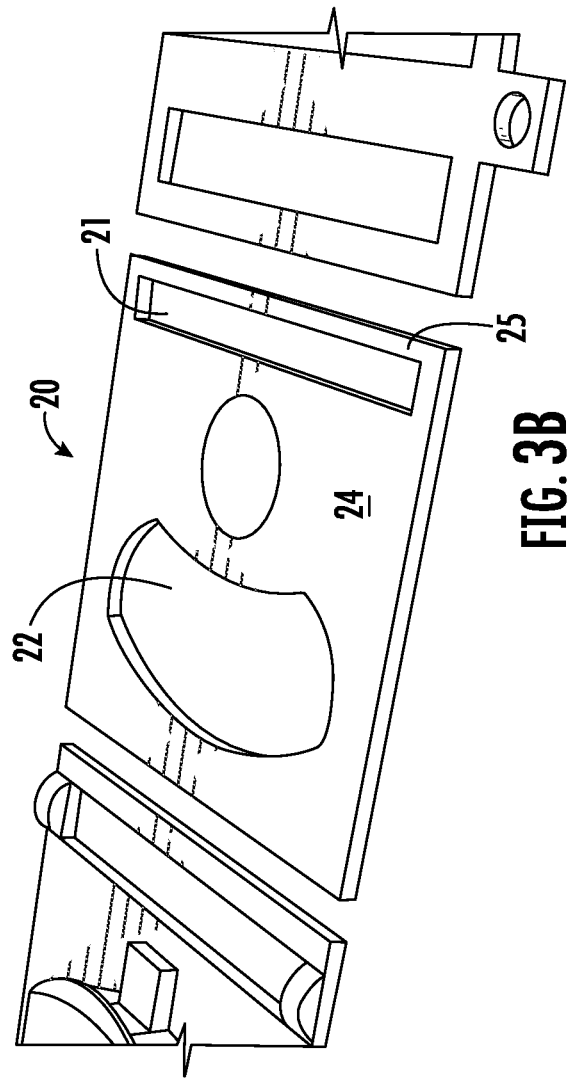
FIG. 3B shows a perspective and more detailed view of the flat end buckle.

A flat end buckle 20 at the other end of the leash/collar strap is shown on the right in a top view in FIG. 3A and in the middle in a perspective view in FIG. 3B. The flat end buckle 20 has a flat metal body 24 having a slotted opening 21 at an end 25 to provide an attachment location for the other end of the leash/collar strap opposite the collar end. The leash/collar strap can be attached to the opening 21 in the same manner as described with respect to the attachment of leash/collar strap to buckle slide 10. In the flat body 24 there is another opening 22 for receiving a post from the adjustable receiver 30 to form a leash loop or to store the incorporated leash/collar strap, as explained in greater detail below. The opening 22 is also shaped to operate as a bottle opener, such as a beverage bottle cap opener. A round laser cut bar code/logo hole 23 in the flat body 24 provides direction to a designated website for animal owner information and leash/collar brand identification. Not shown in FIGS. 3A-3C, the buckle 20 may also have an extension with a hole of varying shapes for different purposes. This feature appears in the flat end buckle of FIG. 4D.

Figure 3C:
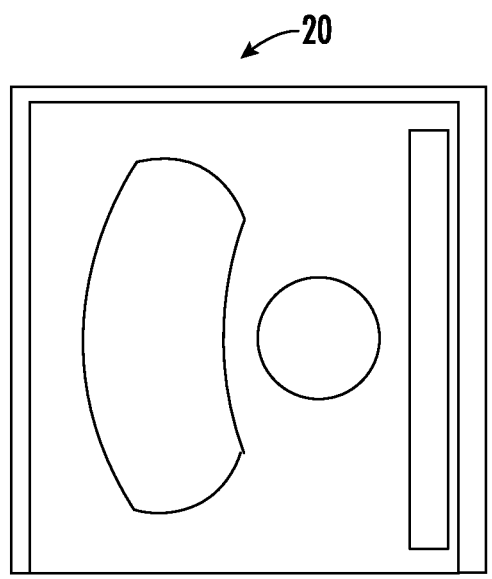
FIG. 3C shows a top view of a modified flat end buckle.

FIG. 3C shows a top view of the flat end buckle 20 which has a rectangular outline. In this embodiment the buckle 20 is of even thickness of slightly less than 0.09 inches, 1.79 inches long and 1.25 inches wide. The buckle 20 can also be in a range of thicknesses from 0.06 to 0.12 inches, a range of lengths from 0.5 inches to 3 inches and a range of widths from 0.5 to 3 inches.

Figure 4A:
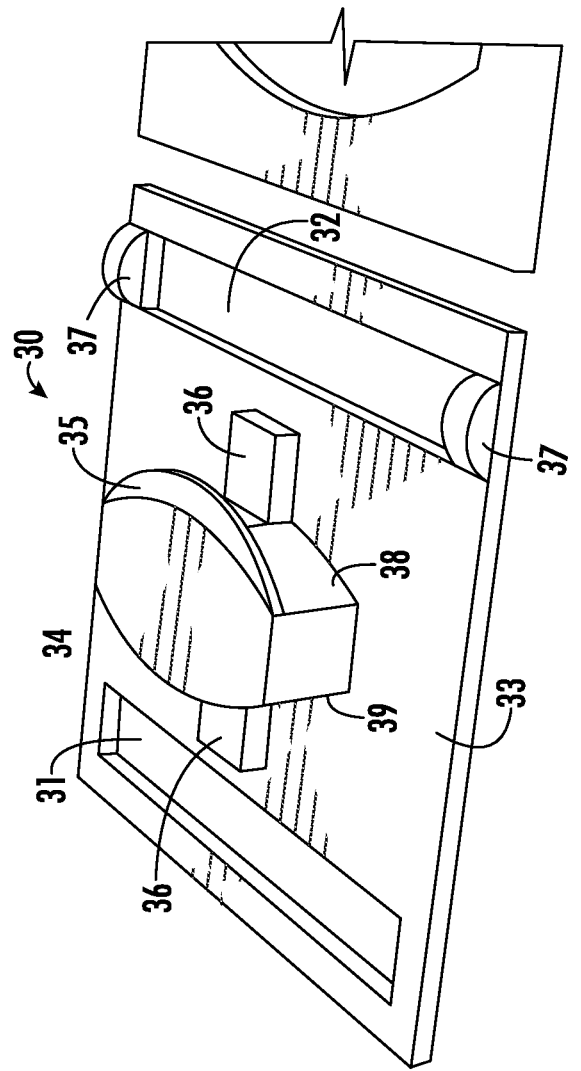
FIG. 4A shows a perspective view of the adjustable receiver of FIG. 3A.

The adjustable receiver is positioned on the leash/collar strap between the buckle slide and end buckle. Perspective views of an adjustable receiver 30 are shown in FIG. 4A. The adjustable receiver 30 has a flat body 33 with two slotted strap guide openings 31 and 32 at either end of the body 33 for the leash/collar strap; a shaped post 34 extending away from one side of the flat body 33, the other side of the body 33 (not shown in FIG. 3A) remaining flat; a rectangular magnet 36 running underneath the post 34 to receive and magnetically attach to the metallic flat end buckle 20; and rocker bump/ramps 37 at the ends of the one of the strap guide openings 31 and 32. At the top of the post 34 is a cap lip 35 which faces toward the strap guide opening having the rocker bump/ramps 37. In this example the rocker bump/ramps 37 are located at the ends of the leash/collar strap guide opening 32.

The adjustable receiver 30 lies on the leash/collar strap between low profile buckle slide 10 and the flat end buckle 20. The leash/collar strap passes through the strap guide openings 31 and 32, and behind the flat body 33 on the side opposite the shaped post 34. The location of the adjustable receiver 30 on the leash/collar strap can be adjusted in the same manner as the buckle slide 10 for the full length of the leash/collar strap. This large adjustment range creates a leash/collar combination that will fit any dog, from small to large.

The adjustable receiver 30 also allows the user to create a secure leash handle with the leash length adjustment. The receiving post 34 of the adjustable receiver 30 is complementarily shaped to fully engage with the post opening 22 in the flat end buckle 20. Thus in a top view the side surface 38 (and the opposite side surface 39) of the post 34 is crescent-shaped and the complement of the side surface 28 of the post opening 22 of the flat end buckle 20. Furthermore, the height between the top of the magnet 36 and bottom of the lip 35 of the post 34 matches the thickness of the flat end buckle 20. When the post 34 is inserted into the post opening 22, the magnet 36 providing a flat surface for the adjustable receiver 30 attracts the metal of the buckle 20 so that the buckle 20 and receiver 30 securely fit and lock into each other. The buckle 20 and receiver 30 may have different shapes including, but not limited to: circular, triangular, square, trapezoidal, 'T' or any other interlocking shapes.

The flat end buckle 20 and the adjustable receiver 30 can fit and lock together in two opposing directions to place the incorporated leash/collar in operative and storage configurations. For the operative configuration the leash/collar strap between the buckle 20 and receiver 30 form a loop for a leash handle to the collar. The flat end buckle 20 and receiver 30 are joined so that the side surface 38 of the receiver post 34 engages the side surface 28 of the post opening 22 of the flat end buckle 20. The flat body 24 of the buckle 20 rests on the bumps 37 of the adjustable receiver 30 with top of the buckle body 24 near the side surface 28 of the post opening 22 fitting under the receiver lip 35. The action of the magnet 36 maintains the adjustable receiver 30 against the metal buckle 20. This arrangement provides a strong leash loop which is resistant to variable forces along the leash, such as caused by a lunging dog on the collar. The rocker bump/ramps 37 on the side of the lip 35 help release the formed leash loop. The rocker bump/ramps 37 provide a lever to remove the flat end buckle 20 from under the lip 35.

For a storage configuration the leash/collar strap is wound around the collar (and flat buckle slide 10) and held in place for storage by the engagement of the buckle 20 at the end of the leash/collar strap to the adjustable receiver 30. The location of the adjustable receiver 30 is set so that flat end buckle 20 which is looped around the collar is able to engage the adjustable receiver 30. In this case the side surface 39 of the receiver post 34 engages the side surface 28 of the post opening 22 of the flat end buckle 20 and the magnet 36 engages the flat end buckle 20. for a secure, yet releasable storage configuration.

Hence among the parameters to be considered for the magnet 36 and the metal of the flat buckle 20 are attractive force, size, cost and weight of these components. The adjustable receiver 30 is sized to fit the flat end buckle 20 and both elements can have a wide range of sizes and dimensions.

As shown above both post sidewalls 38 and 39 of the adjustable receiver 30 are shaped complementarily with respect to the sidewall 28 of the flat buckle 20. As a result, in a top view the post 34 is shaped symmetrically about an axis perpendicular to the longitudinal direction of the leash/collar strap, i.e., the sidewalls mirror each other across the axis. But the post of, and the adjustable receiver 30 itself, may be shaped and arranged differently as long as this symmetry is retained.

Figure 4C:
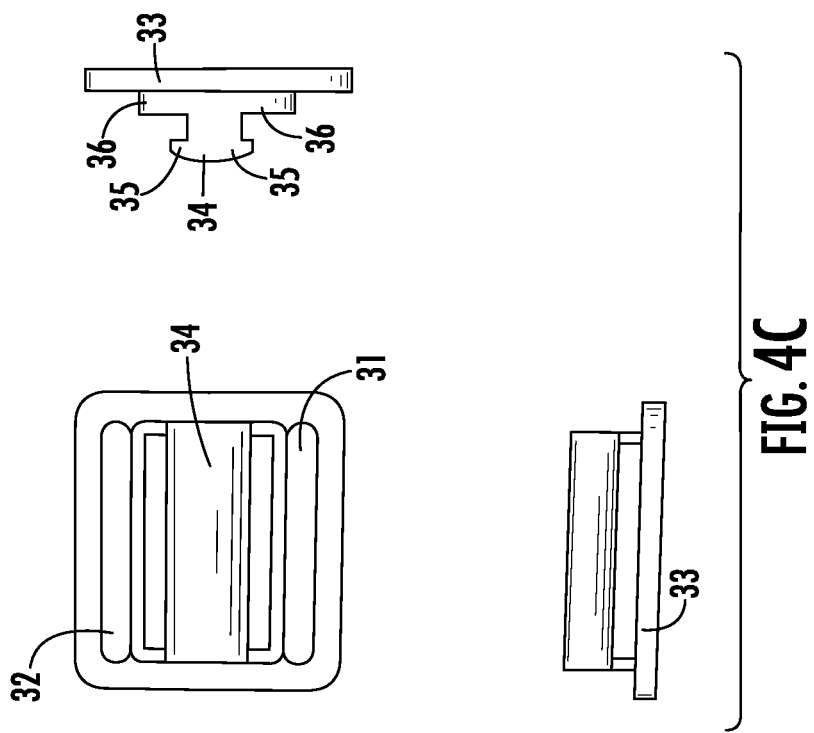
FIG. 4C shows different side views of the FIG. 4B adjustable receiver.
Figure 4B:
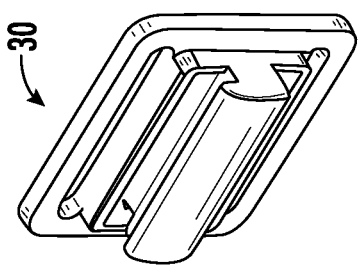
FIG. 4B shows a perspective view of another adjustable receiver in accordance with the present invention.
Figure 4D:
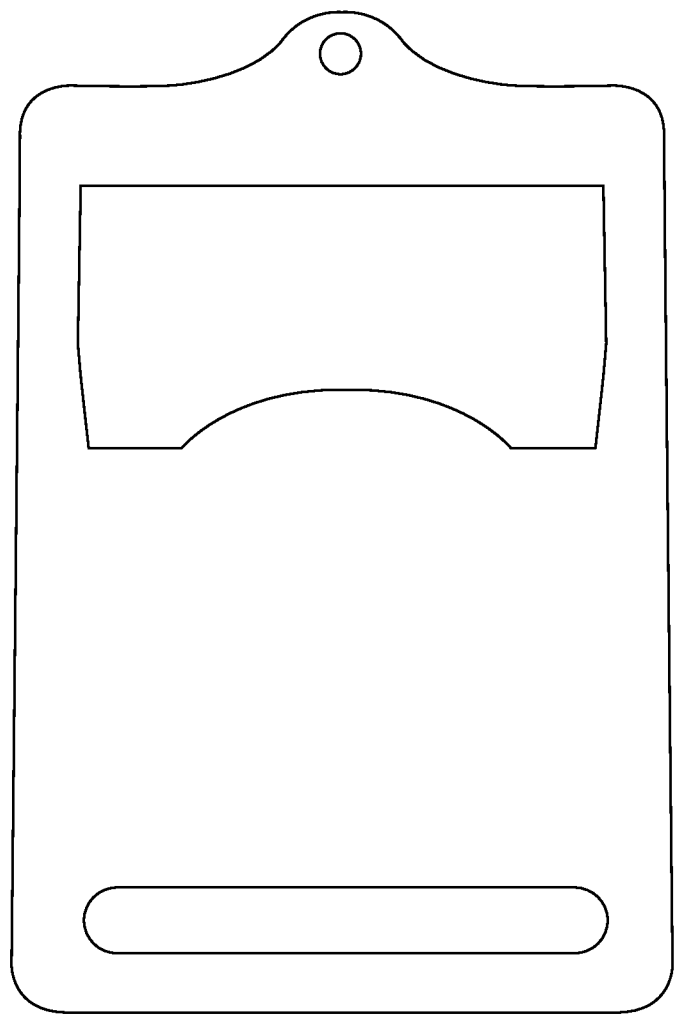
FIG. 4D shows a flat end buckle which corresponds to the adjustable receiver of FIGS. 4B and 4C.

For example, FIGS. 4B and 4C illustrate an adjustable receiver with a post 34 which is rectangular in shape in a top view. The magnet 36 runs under, and forms the base of, the post 34 and no bump/ramps 37 are used in adjustable receiver 30. Flange lips 35 appear above both sidewalls of the post 34 but the lip above the sidewall used in the operative configuration is larger for more substantial engagement of the receiver 30 and buckle 20. FIG. 4D illustrates a flat end buckle which corresponds to the adjustable receiver of FIGS. 4B and 4C. The sidewall 38 of the opening in the FIG. 4D flat end buckle is straight to match the straight sidewalls of the post 34 of the FIGS. 4B and 4C adjustable receiver. The flat end buckle further has an extension with a hole which in this example is hexagonally shaped to receive a tool, such as a socket, wrench screwdriver, and other similar items.

In one example, the adjustable receiver of FIGS. 4B and 4C is 1.125 inches long (along the strap extension), 1.25 inch wide (strap width) and 0.39 inches high (from bottom of adjustable receiver to top of post), and the distance between magnet base and flange lips is slightly more than 0.09 inches. The corresponding flat end buckle is 2.11 inches long, 1.25 inches wide and 0.09 inches thick. These dimensions are merely illustrative and not limiting so that a range of sizes and dimensions can be used for these elements to suit particular applications and circumstances.

Figure 5A:
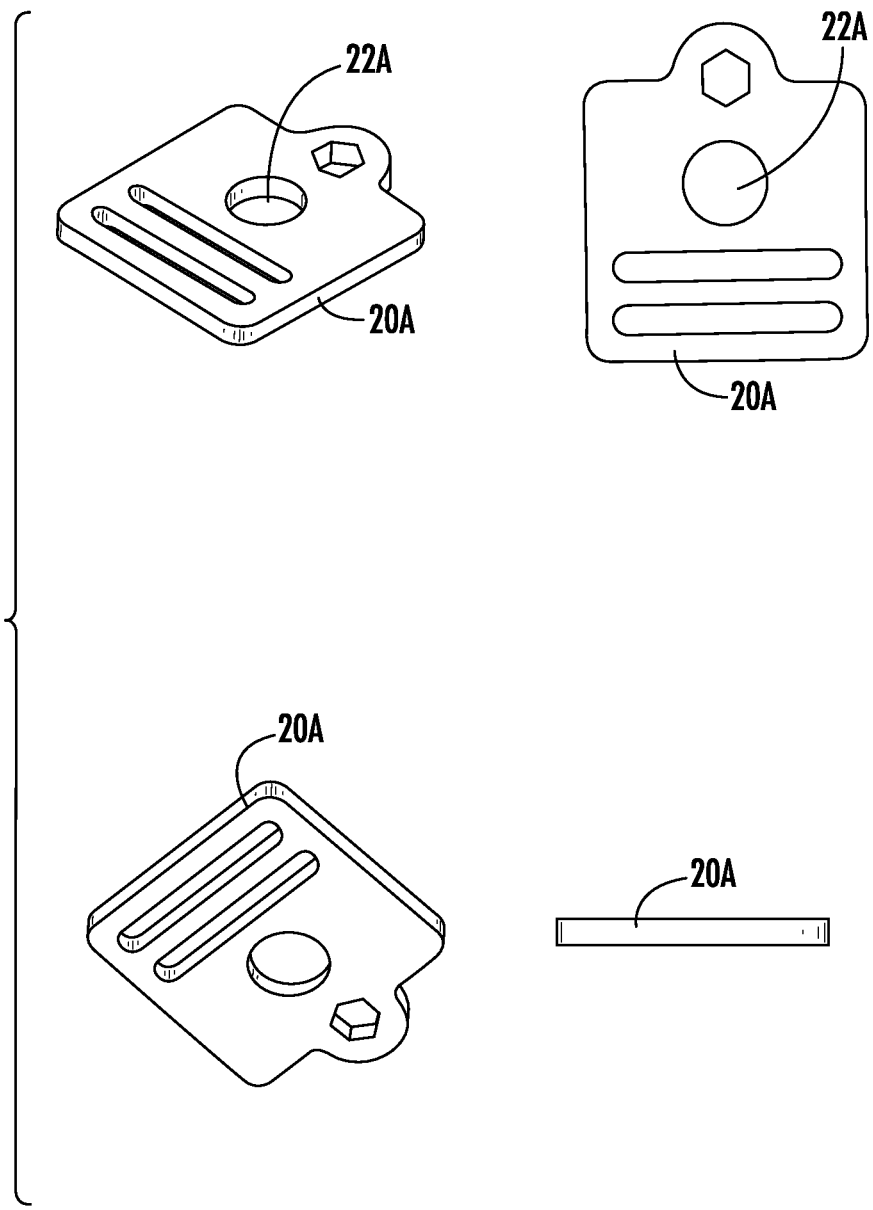
FIG. 5A shows different perspectives view of another flat end buckle in accordance with the present invention.
Figure 5B:
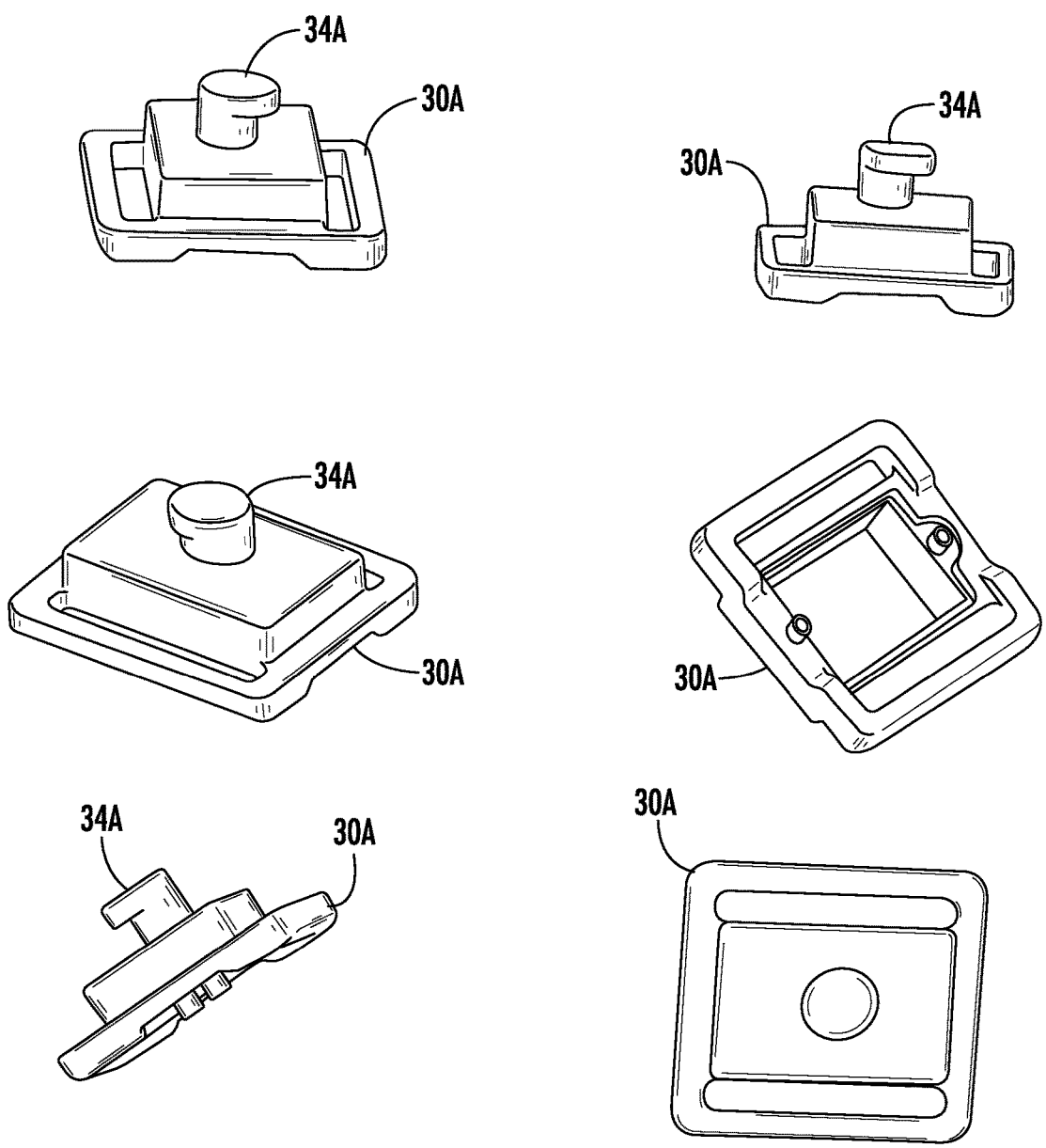
FIG. 5B shows different perspective views of another adjustable receiver 30 corresponding to the FIG. 5A flat end buckle.

FIG. 5A illustrates another flat end buckle 20A and FIG. 5B illustrates a corresponding adjustable receiver 30A. The buckle 20A has two slotted openings to receive the leash/collar strap such that the buckle 20A while attached to an end of the leash/collar strap can also be moved along the strap. For example, the strap end can be fixed to or around the straight end of the buckle 20A. The rest of the strap can then be passed through one of the slotted openings around the metal shaft separating and defining the two slotted openings and passed through the second in the same manner as previously described for the buckle slide 10. This arrangement allows some play in the position of the buckle 20A with respect to the adjustable receiver around the collar in a storage configuration.

The flat body of the buckle 20A has a central circular opening 22A and a smaller hexagonal opening around which an accessory might be hung. The adjustable receiver 30A of FIG. 5B is similar to the adjustable receiver shown and described with respect to FIGS. 4B and 4C. But the post 34A is circular (in a top view) and dimensioned to match the dimensions of the opening 22A of the buckle 20A. A flanged lip also appears above one side of the post 34A for a more secure engagement and lock between the receiver 30A and the end buckle 20A.

A short section of stretchable material, such as bungee webbing, may also be used to connect the non-stretchable webbing material of the leash/collar strap and the flat end buckle 20. The bungee material stretches to hold the flat end buckle 20 to the adjustable receiver 30 in storage configuration and keeps the wraps of the leash stored neatly around the collar and allows for adjustment play.

Figure 6:
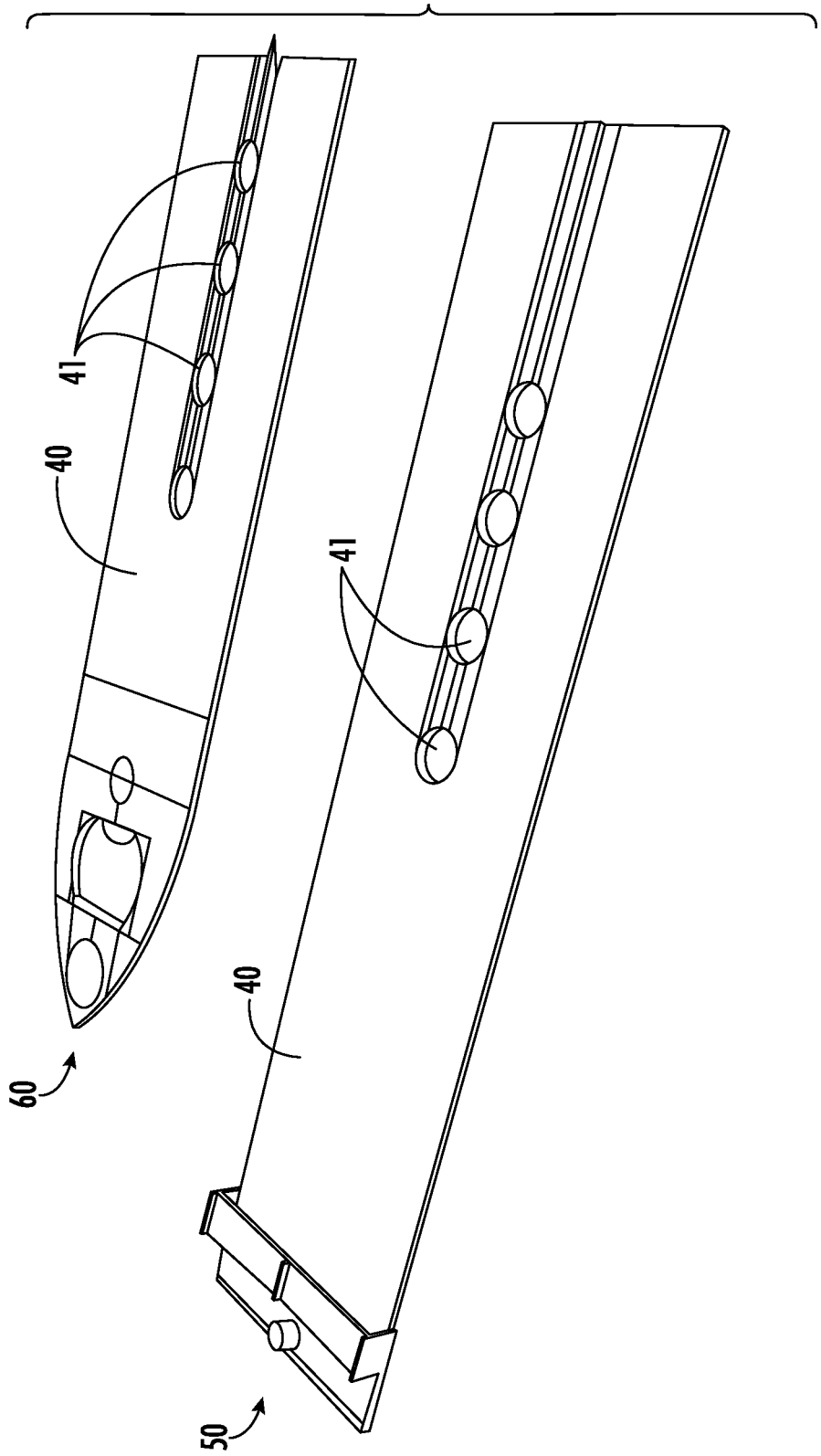
FIG. 6 shows in a perspective view the opposite ends of an improved incorporated leash/collar according to another embodiment of the present invention.

In another embodiment of the incorporated collar/leash, the leash/collar strap is constructed from a stretchable webbing material, such as an elastic polymer. The incorporated leash/collar strap 40 in FIG. 6 shows the two ends of the incorporated collar/leash. A collar receiver guide and barb assembly 50 at the bitter end (the dog end of the leash) is shown at the bottom left of the drawing and the handle/leash re-attach assembly 60 shown at top right of the drawing and located at the other end (the handler end) of the leash/collar strap 40.

Figure 7A:
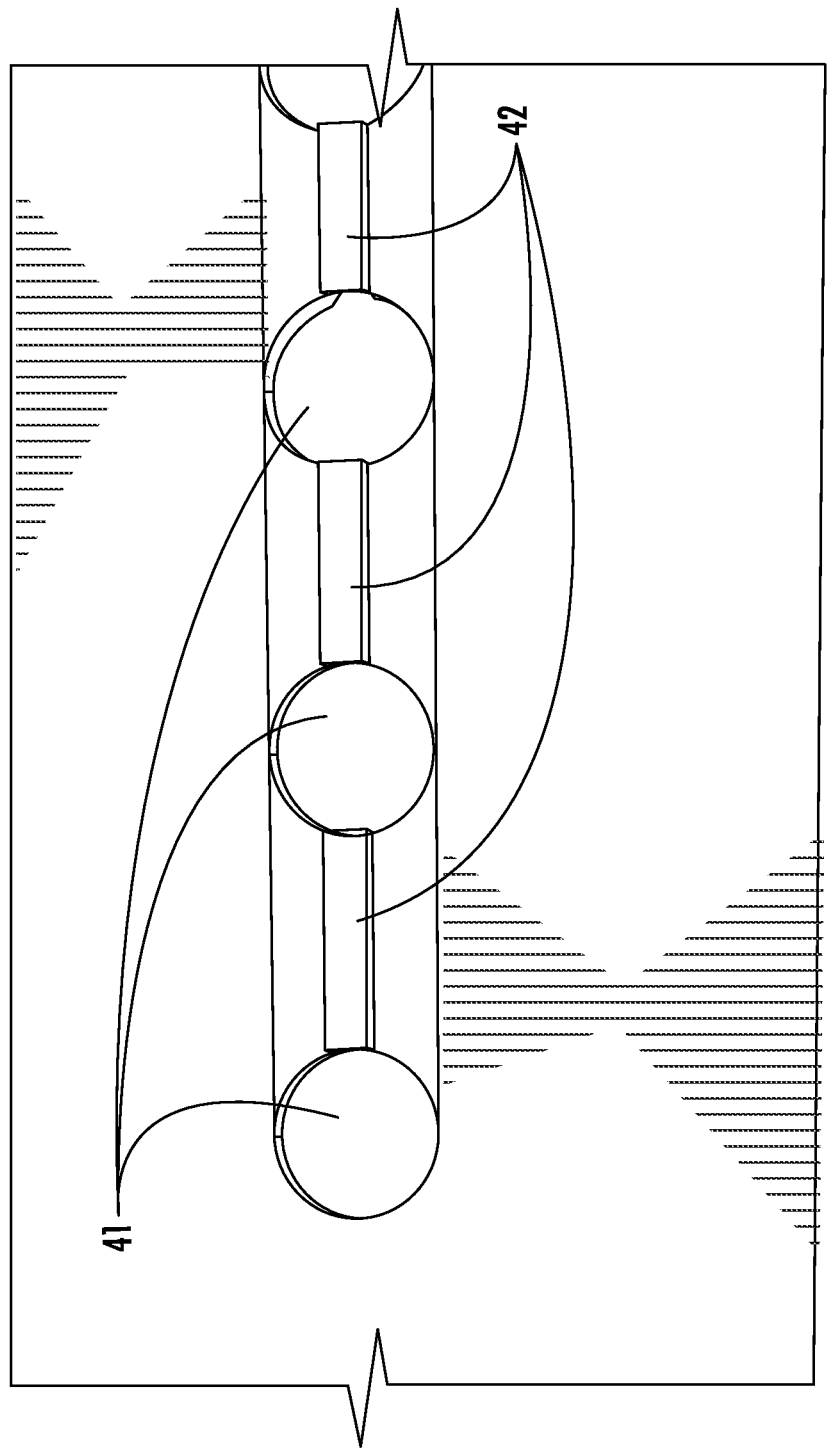
FIG. 7A shows details of a hole and rail/channel system of the improved incorporated leash/collar of FIG. 6.
Figure 7B:
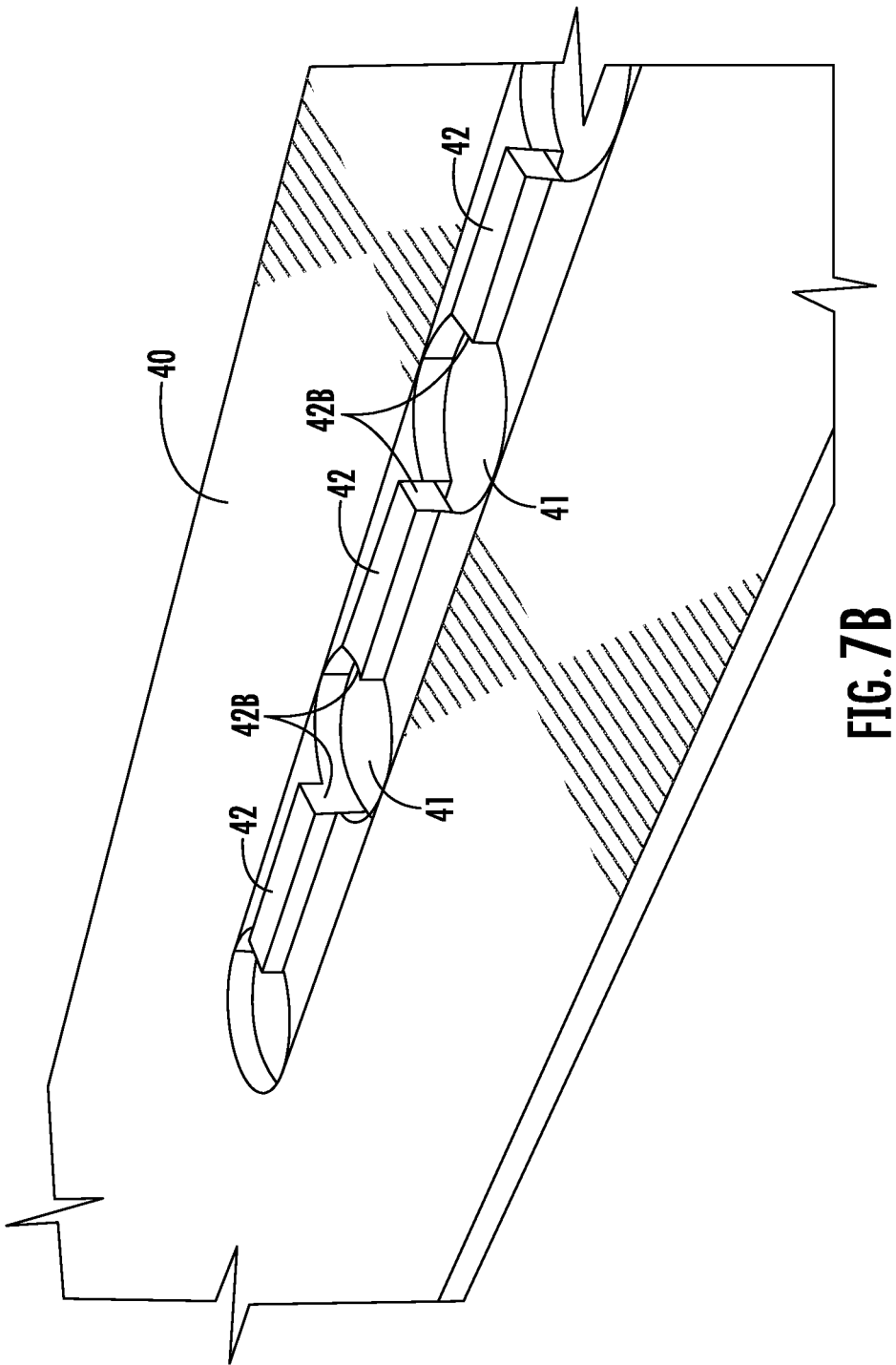
FIG. 7B shows a perspective top view of the hole and rail/channel system of FIG. 7A.
Figure 7C:
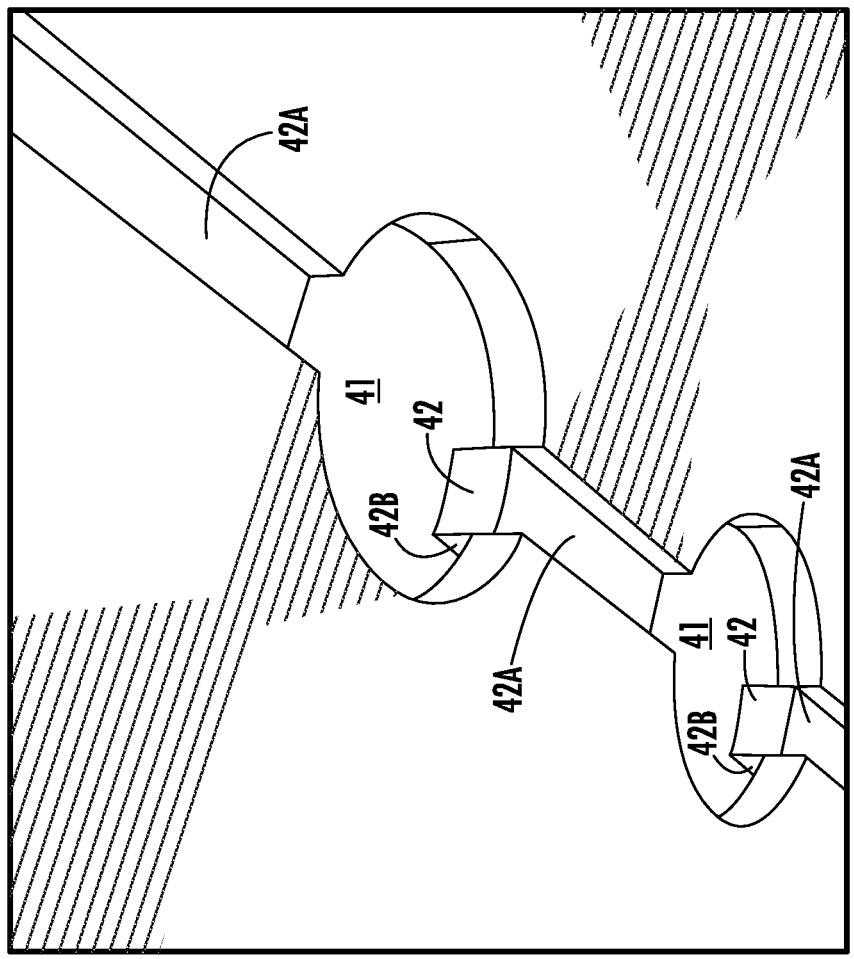
FIG. 7C shows a perspective bottom view detail of the hole and rail/channel system of FIG. 7A.

A series of holes 41 run along the center of the leash/collar strap 40 from approximately 10 inches from the bitter end on the collar side (at the dog) to within 6 inches of the other end (handler end) 60. FIGS. 7A-7C shows the holes 41 in the leash/collar strap 40 in more detail. The distributed holes 41 capture studs or hooks to form the base collar through a base collar guide, to attach the leash/collar strap 40 to itself so that the leash stays in place in this storage configuration, or to form the loop handle for the leash in an operative configuration. Accessories, such as a dog tag, capture magnet, flashlight, GPS tracking module, multi-tool and other items, can be attached to the collar/leash 40 by accessory studs or hooks for the holes 41. The holes 41 can be any geometric shape including, but not limited to, round, oval, square, a T or a cross pattern. Further explanations of the leash/collar strap 40 are detailed below.

A rail/channel structure 42 in the stretchable webbing material runs between the holes 41 for the length of the distributed holes. FIGS. 7A and 7A shows the rail portion 42B of the rail/channel 42 on one side of the leash/collar strap 40. The rail portion 42B is formed by vertically raising the elastic polymer material of the leash/collar strap 40. On the other side of the leash/collar strap 40, the underside of the rail/channel 42, shown in FIG. 7C, a channel portion 42A, the reciprocal of the rail portion 42B, runs between the holes 41.

The rail portion 42B and channel portion 42A are sized and shaped so that the channel portion 42A on one side of the leash/collar strap 40 can capture the rail portion 42A on the opposite side of the leash/collar strap. The rail portion 42B nests into an embedded, concave track of the channel portion 42A in an elastic tongue-and-groove arrangement similar to a Ziplock® (a registered trademark of the S.C. Johnson & Son, Inc. of Rachine, Wisconsin) enclosure. The raised rail/channel structure 42 aids in the neat stacking of the leash/collar 40 about itself in a storage configuration with the raised metal guide on the collar receiver guide and barb assembly 60.

Figure 8:
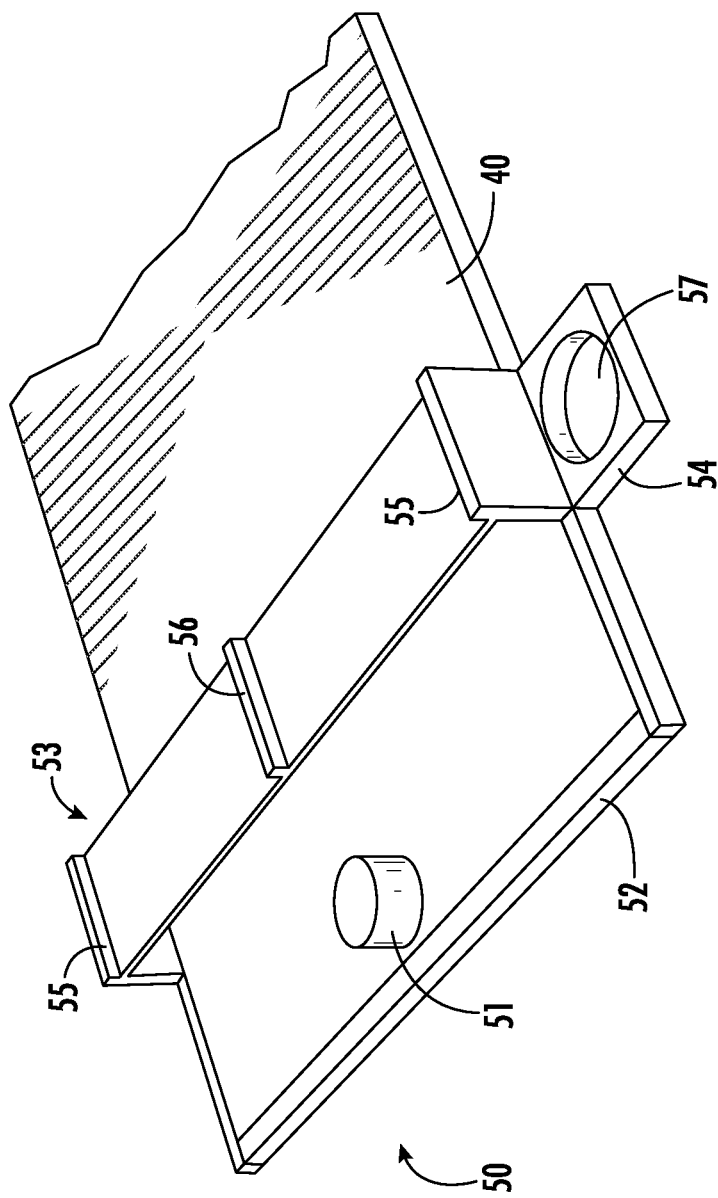
FIG. 8 shows details of the collar receiver guide and barb attachment assembly of the improved incorporated leash/collar of FIG. 6.

The collar receiver guide and stud assembly 50 of the leash/collar strap 40 is shown in FIG. 8. The collar receiver guide and the stud assembly 50 has a rectangular flat body 52 to which the webbing material of the leash/collar strap 40 is attached. A post or stud 51 extends perpendicularly from the flat body 52 at an end of the leash/collar strap 40 through the webbing material. The diameter of post or stud matches that of the holes 41 and the length of the post or stud is preferably at least the thickness of the leash/collar strap to prevent disengagement when the post or stud 51 is set into one of the holes 41.

A collar guide hoop 53 extends from the sides of the flat body 52 displaced away from the stud 51 over the strap 40. The collar guide hoop 53 is aligned perpendicularly to the length of leash/collar 40, and is rectangular in a view along the leash/collar 40. The top of the guide hoop 53 has a center guide rail 56 and two side rails 55, all of which are parallel to the length of the leash/collar strap 40 in the body 52. The center guide rail 56 is sized like the rail portion 42B to fit into and engage the channel portion 42A of the leash/collar strap 40, and the side rails 55 are spaced apart to receive the leash/collar strap 40 between them. The flat body 52 has an extended tag 54 having a hole 57 for the attachment of a traditional dog tag.

The flat body 52 of the collar receiver guide and the stud assembly 50 may embedded into the polymer material of the leash/collar 40 or attached to the material by stitching, rivets, glue or a slotted metal channel to a corresponding rail in the webbing material. The collar receiver guide and stud assembly 50 may be constructed from metal, plastic, reinforced graphite, or other materials having the desirable characteristics of rigidity, strength and durability.

The collar receiver guide and stud assembly 50 forms a collar by looping the end of the leash/collar strap 40 and inserting the stud 51 into a hole 41 and passing the rest of the strap 40 through the collar guide 53. If the size of the collar needs to be adjusted, the stud 51 is detached from the original hole 41 and the leash/collar strap 40 slid through the collar guide 53 to the desired collar size. The stud 51 is then re-inserted into the corresponding hole 41. The collar guide 53 and the stud 51 provide a lock for the leash/collar strap 40 so that it neither loosens nor tightens on the animal. When the leash/collar strap 40 is wrapped around the collar, the center guide 56 fits into the channel portion 42A to hold the first wrap of the leash/collar strap 40 around the collar and the side rails 55 align the leash/collar strap 40 around the collar. This arrangement aids in the tidy stacking of the leash/collar strap 40 around the base collar in a storage configuration.

Figure 9A:
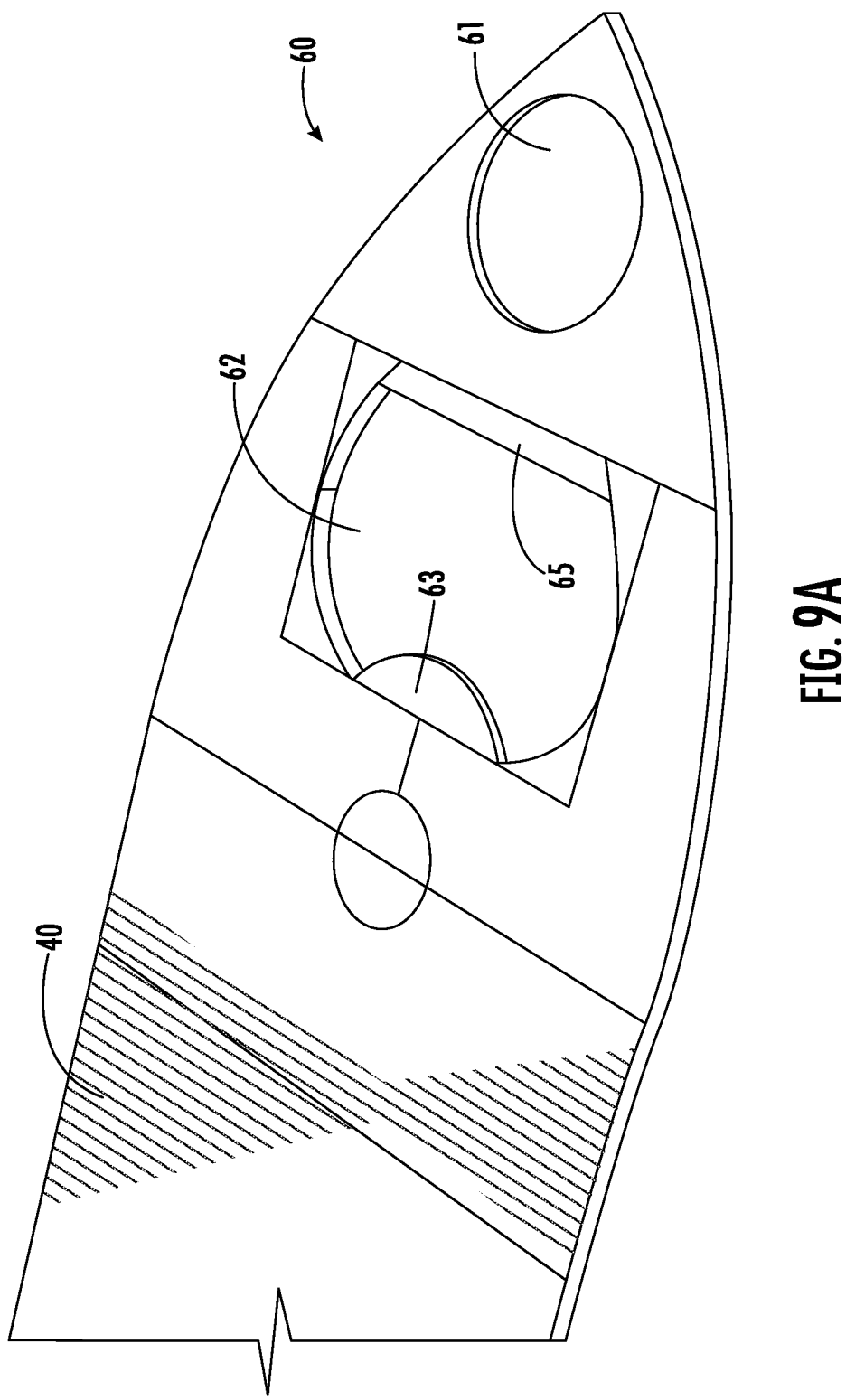
FIG. 9A shows in a perspective top view of the leash handle/leash re-attach assembly in FIG. 6.

The leash handle/leash re-attach assembly 60 shown in a top perspective view in FIG. 9A and in a bottom perspective view in FIG. 9B, is located at the user end of the leash/collar strap 40. The assembly 60 has a flat body with a narrowing tip. A first aperture 61 is located near the tip and a second aperture 62 in the flat body removed from the tip. Both apertures 61 and 62 are centered along the center axis of the leash/collar strap 40. The second aperture 62 is shaped with a straight metal edge 65 near the aperture 61 and a convex metal edge 63 opposing the straight edge 63, as seen in FIG. 9A. A bottom view of the assembly 60 (FIG. 9B) shows a hook 64 in the form of a short straight stud angled away from the tip. The hook 64 also has a cap at its end with flanges 64B. Alternatively the hook 64 may also be curved.

For the operative configuration of the incorporated leash/collar, the leash/collar strap 40 is looped back on itself. The hook 64 engages one of the holes 41 to form a sturdy and looked handle loop with the angle and capped flanges of the hook stud preventing disengagement of the hook 64 from the hole 41. The loop handle can be sized by selecting the appropriate hole 41. The first opening 61 is sized to accept a finger grip to disengage the hook 64 and pull the loop handle apart.

In the storage configuration the engagement of the hook 64 with one of the holes 41 provides a secure lock for the incorporated leash/collar. The straight edge 65, convex edge 64 and hook 64 of the leash handle/leash re-attach assembly 60 are preferably formed from a single metal piece which is embedded into the elastic polymer of the leash/collar strap 40. The single metal unit can be designed for additional integrity. The unit can be extended to cover the opening 61 with the underside exposed. In storage configuration a magnetized stud is inserted through a hole 41 in a location corresponding to that of the opening 61. The exposed metal in the opening 61 attaches to the magnetized stud so that the tip of leash handle/leash re-attach assembly 60 is also secured.

The two metal edges 63 and 65 in the second aperture 62 may be shaped to provide a handy bottle opener.

Figure 10A:
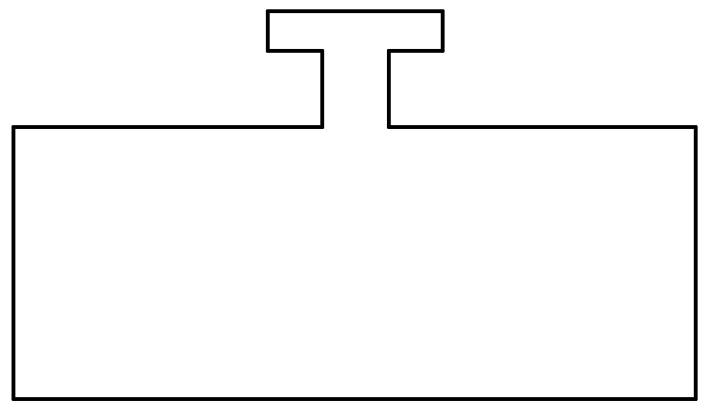
FIGS. 10A and 10B shows accessories which might be attached to the improved incorporated leash/collar of FIG. 6.
Figure 10B:
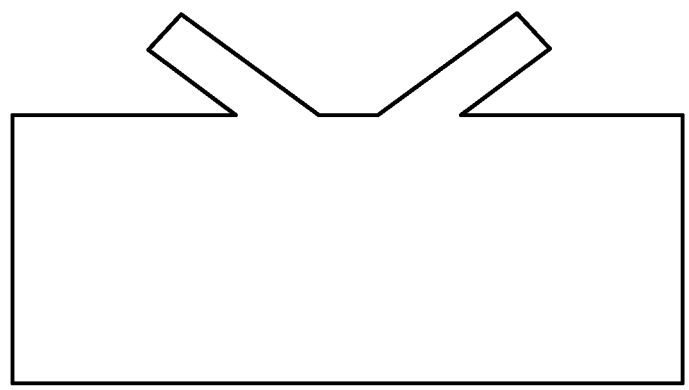

In addition, the rail/channel structure 42 with the holes 41 allow accessories to be attached to the leash/collar strap 40. Accessories with modified studs or hooks with the strap holes 40 provide secure attachment for the accessory. With a T-lock system, for example, studs may be inserted into the holes 41 and then twisted to fall into and engage the channel portion 42A, providing additional security for accessories attached to the modified studs. FIG. 10A shows an accessory in the form of a case bearing a T-lock stud. The case can carrying accessory items, such as a GPS tracking module unit, flash light, hand multi-tool and other useful objects. FIG. 10B shows an accessory case with two slanted studs to securely engage neighboring holes 41. Alternatively the accessory case might be eliminated and the modified studs or hooks attached directly to the accessory item itself.

Furthermore, the elements of the described leash/collar may also be used for purposes and applications other than those of a dog collar or leash. These buckles and straps can be arranged and adapted for many uses beyond collars and leashes, including belts, cargo straps, belt catches, and cargo and hammock loops.

The end buckles and receivers of FIGS. 11A-11D can be arranged and adapted to be used with a strap or webbing to create a multi-purpose quick-release strap system.

Figure 11A:
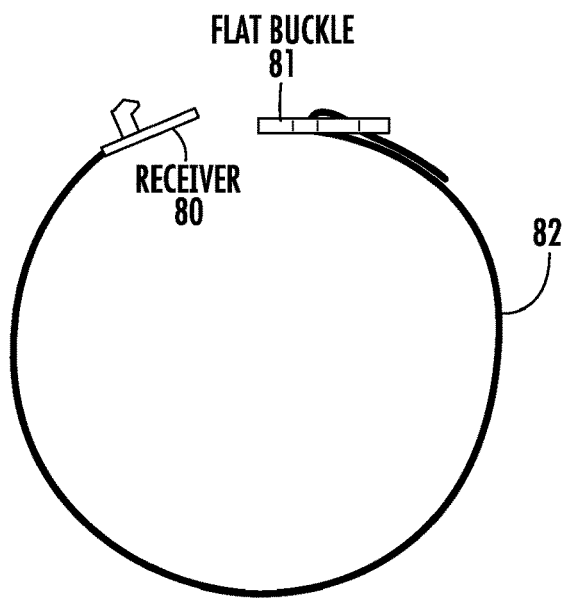
FIG. 11A shows the arrangement of an receiver and a flat end buckle having with a strap into a belt, the flat end buckle forming a ladder lock with the strap.

FIG. 11A illustrates how the flat end buckles and receivers similar to those shown in FIGS. 4B-4D form a belt. In this embodiment one end of a strap 82 is attached to a web channel of a receiver 80 and the flat end buckle 81 has a ladder lock with the strap 82 to adjust the length of the belt with the receiver 80. The strap 82 is passed through the loops of a wearer's trousers, for example, and joined together by engaging the post of the receiver 80 with the opening of the flat end buckle.

Figure 11B:
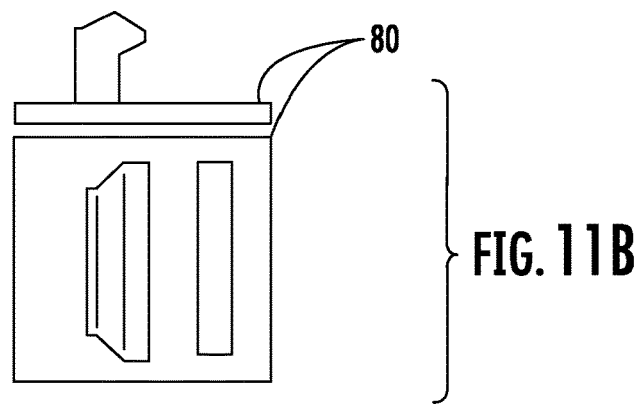
FIG. 11B shows the FIG. 11A receiver in more detail.

In two views FIG. 11B shows details of the receiver 80 which has a single web channel by which one end of the strap 82 is attached such as with a stitched loop. The post of the receiver 80 is rectangular in a top view with a magnet forming the base of the post. While flange lips of the post cap could be placed above both sidewalls of the post such as shown in FIGS. 4B and 4C, in this embodiment a lip is placed above the post sidewall facing the sidewall of the flat end buckle 81 when the receiver 80 and the flat end buckle 81 are engaged.

Figure 11C:
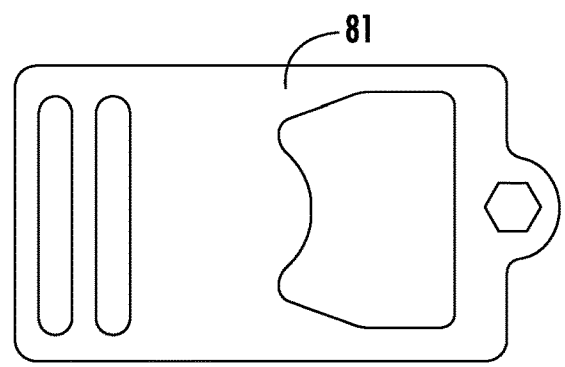
FIG. 11C shows the FIG. 11A flat end buckle in more detail.

The flat end buckle 81 corresponding to the receiver 80 is shown in FIG. 11C. The sidewall of the opening in the flat end buckle 81 is straight to match the straight sidewall of the post of the receiver 80. The flat end buckle 81 is metal which attracts the magnet at the base of the post of the receiver 80 for a more secure engagement between the buckle 81 and receiver 80. Two parallel web channels are located at one end of the flat end buckle 81 for a ladder lock with the strap 82 threaded through the web channels. The flat buckle 81, the receiver 80 and strap 82 create a quick cinching and quick release system, particularly useful as a quick release belt which can be adjusted once and left at that setting.

Figure 11D:
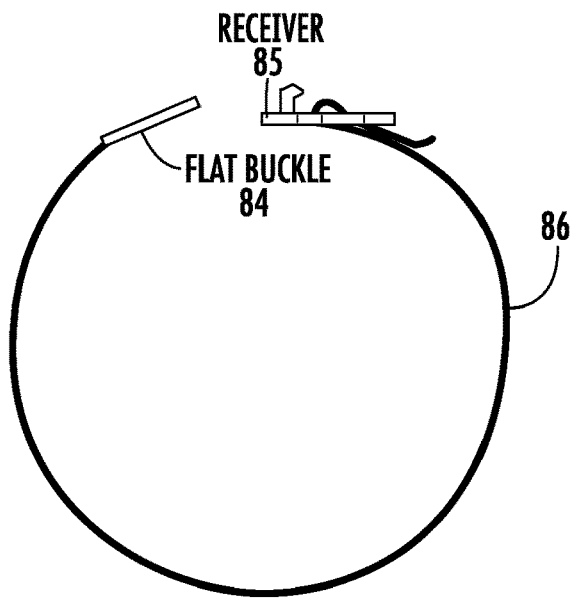
FIG. 11D shows a belt arrangement with an adjustable receiver, a flat end buckle and a strap, the arrangement is complementary to that shown in FIG. 11A.
Figure 11E:
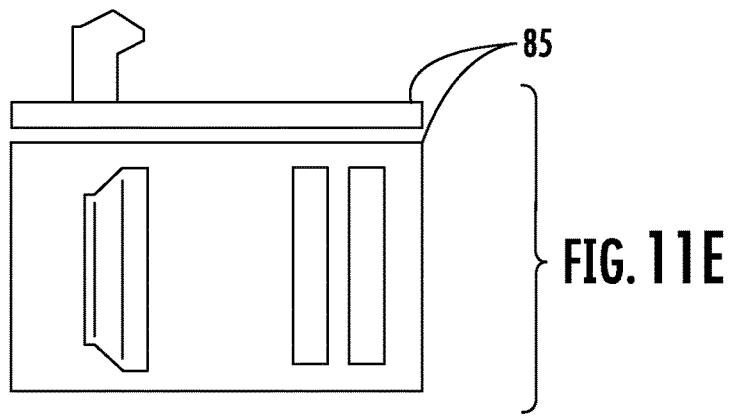
FIG. 11E shows the FIG. 11D adjustable receiver in more detail.
Figure 11F:
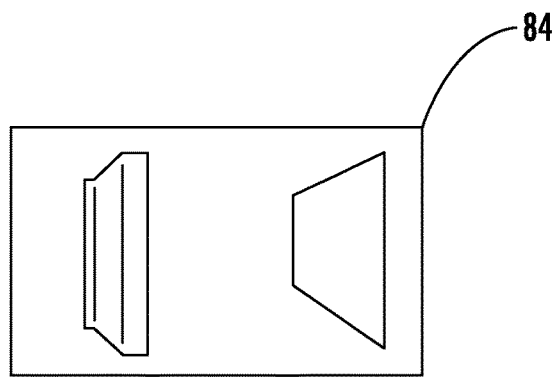
FIG. 11F shows the FIG. 11A flat end buckle in more detail.

FIG. 11D shows a belt arrangement which is complementary to that shown in FIG. 11A. The receiver 84 is adjustable in strap position on one end of the strap 86 with a ladder lock. A flat end buckle 85 is attached to the other end of the strap 86. In two views FIG. 11E illustrates the adjustable receiver 84 with two parallel web channels to help form the ladder lock and FIG. 11F illustrates the flat end buckle 85 with a single web channel by which the strap 86 is attached. The flat end buckle 85, the adjustable receiver 84 and strap 86 create a quick cinching and quick release belt system.

While the magnetic bases for the posts of the previous receivers are described as being above the frames of the receivers, the magnet bases can also be level with the frame of the receiver as long as there is no interference between the engagement between the magnetic base and the metal flat end buckle. This is true for other receivers further described. Furthermore, while the frames of the receivers and the flat end buckles are described as "flat," it should be understood that the term also includes receivers and buckles which are contoured to match a belt or strap wearer's body.

Figure 12A:
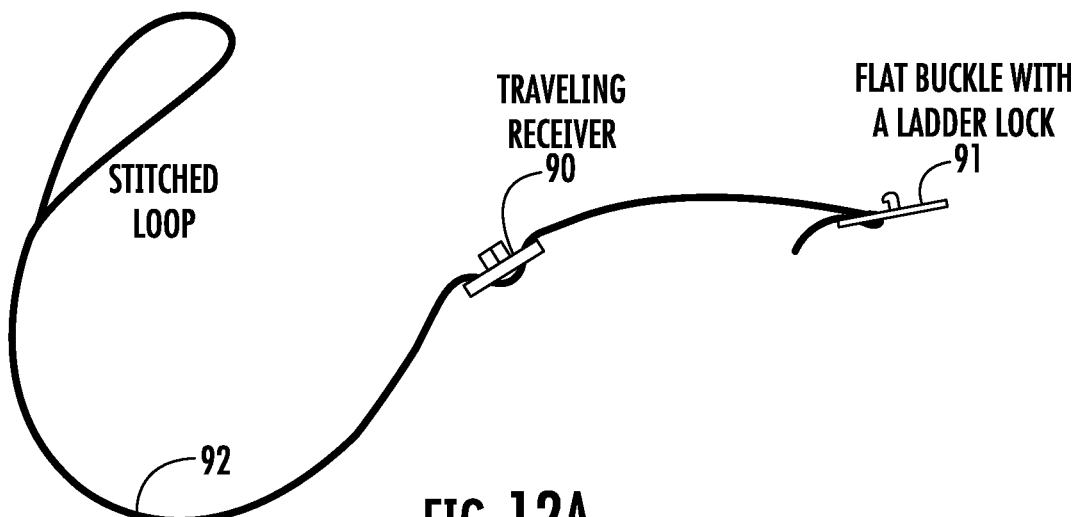
FIG. 12A shows how a receiver, a flat end buckle, and a strap may be arranged and adapted to form a cargo strap or a hammock strap.
Figure 12B:
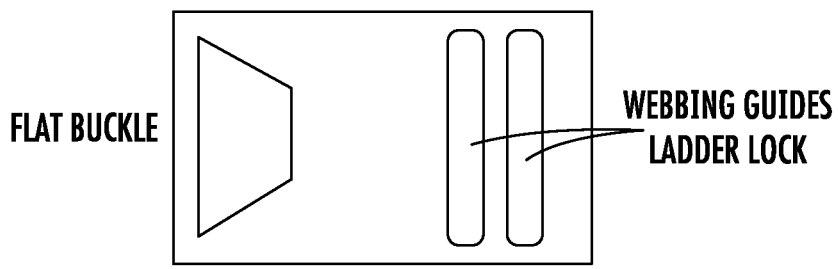
FIG. 12B shows the FIG. 12A flat end buckle in more detail.
Figure 12C:
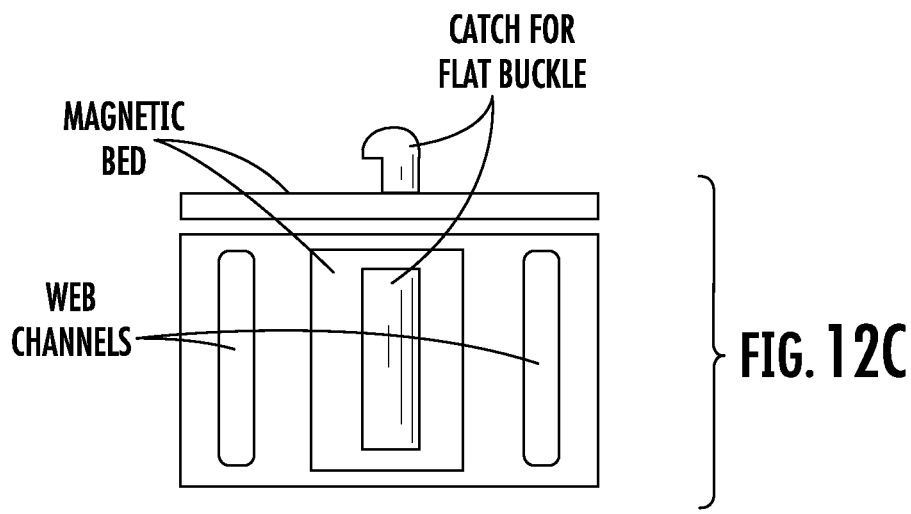
FIG. 12C shows the FIG. 12A receiver in more detail.

FIGS. 12A-12C show how the buckles and straps are arranged and adapted to form cargo strap, according to another embodiment of the present invention. FIG. 12A shows how a flat end buckle 91, adjustable receiver 90 and a strap 92 can provide a cargo strap or a hammock strap. The strap 92 has preferably a loop at one end, such as a stitched loop, and the flat end buckle 91 at the other end by a ladder lock. The adjustable receiver 90 lies between the stitched loop and the flat end buckle 91. The flat end buckle 91 is looped around the object cargo with the opening in the buckle 91 engaging the post of the adjustable receiver 90. The strap is tightened by pulling the loose end (the tag end) of the strap from the ladder lock of the flat buckle 91. Release is quick by loosening the strap at the ladder lock. This arrangement can replace a conventional ratchet strap buckle at a fraction of the weight.

FIG. 12B shows the metal flat end buckle 91 with slotted web channels at one end of the flat buckle body to form a ladder lock with the strap 92. The parallel web channels at one end permit the strap threaded through the web channels to lock in place under tension on the flat end buckle 91 and allow the strap to be moved through the web channels when the tension is released. At the other end of the buckle body, a post opening has a flat side surface to securely engage the corresponding side surface of the post opening of the adjustable receiver shown in FIG. 12C. The adjustable receiver 90 is similar to that shown in FIG. 4B, except that the flange lip of the post cap extends only toward the flat side surface of the flat end buckle post opening when the flat end buckle 91 and adjustable receiver 90 are engaged. A magnet forming the base of the post of adjustable receiver 90 helps secure the engagement between the buckle 91 and receiver 90 with the post flange lip. A slotted web channel is located at the ends of the adjustable receiver 90 and on either side of the post so that the adjustable receiver 30 can be moved and located anywhere along the strap 92 threaded through the two web channels.

Figure 13A:
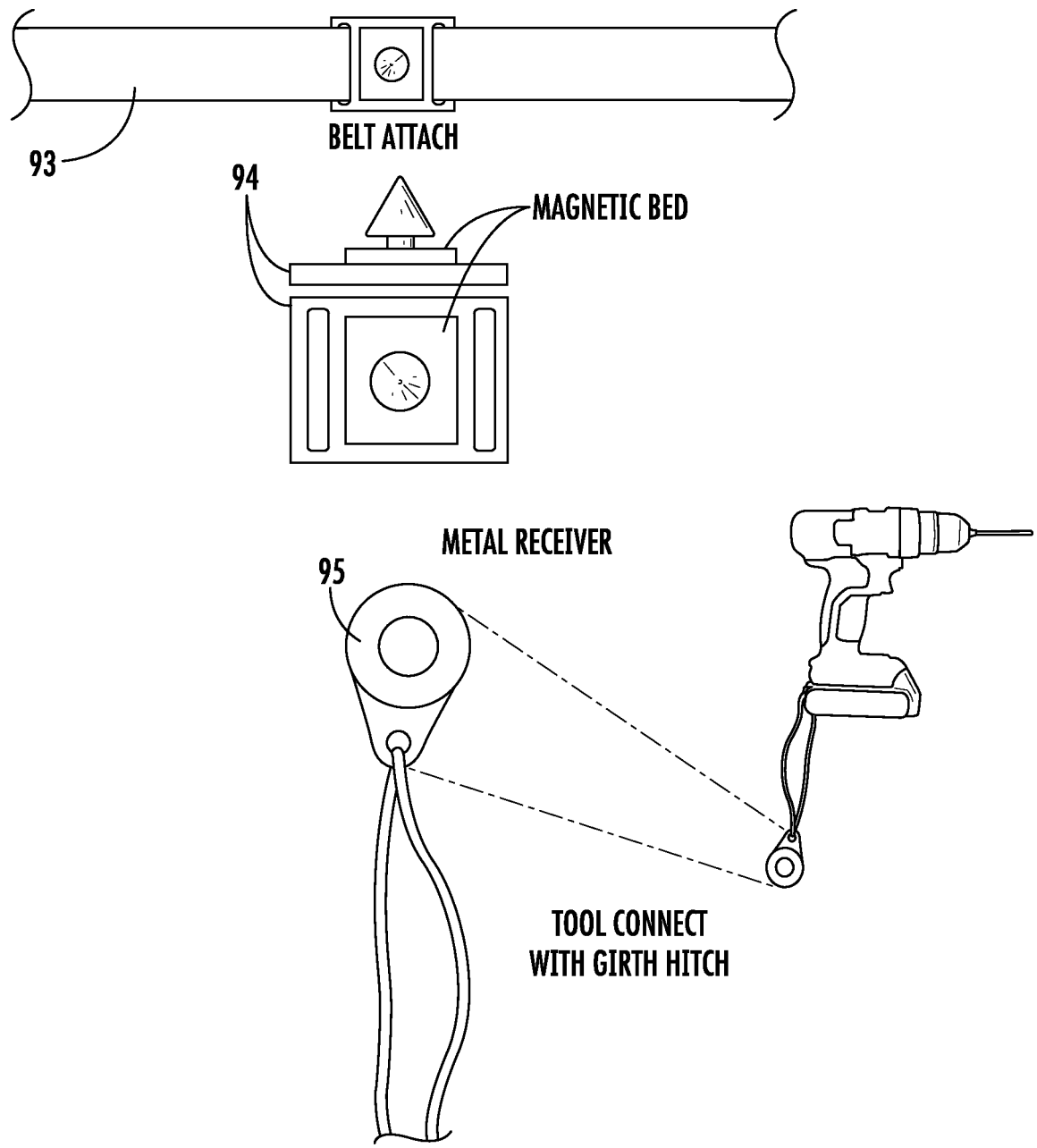
FIG. 13A shows a receiver modified for use on a tool belt with a circular catch to which tools may be attached.

In another embodiment of the present invention, the receiver can be modified for use on a tool belt. The receiver is adapted to hold a circular catch, itself an adaptation of a flat end buckle, for tools or other items to hang from the tool belt. The top drawing in FIG. 13A illustrate how an adjustable receiver 94 is attached to a strap which forms a tool belt 93. In the middle drawing of FIG. 13A shows that the adjustable receiver 94 has a circular post (as viewed from the top) and slotted web channels on either ends of the post to accept the belt 93. The slotted web channels allow the adjustable receiver 94 to be attached to the tool belt with the capability of moving the adjustable receiver 94 along the tool belt. The slotted web channels and the adjustable receiver 94 is preferably wide (for a belt at least 1½ inches wide) to prevent twisting of the tool belt. The post emerges from a magnetic base between the two web channels. The cap of the post has a lip extending around the post to help retain the catch when it engages the adjustable receiver 94.

The bottom drawing in FIG. 13A shows a corresponding catch 95 for the adjustable receiver 94. The flat metal catch 95 has a circular opening larger than the diameter of the receiver post to fit over the post and the flange lip at the post top. The catch 95 has an extension with a second opening by which tools can be attached, as illustrated in the drawing. The catch 95 engages the magnetic base of the adjustable receiver 94 and the flange lip of the post cap.

Figure 13B:
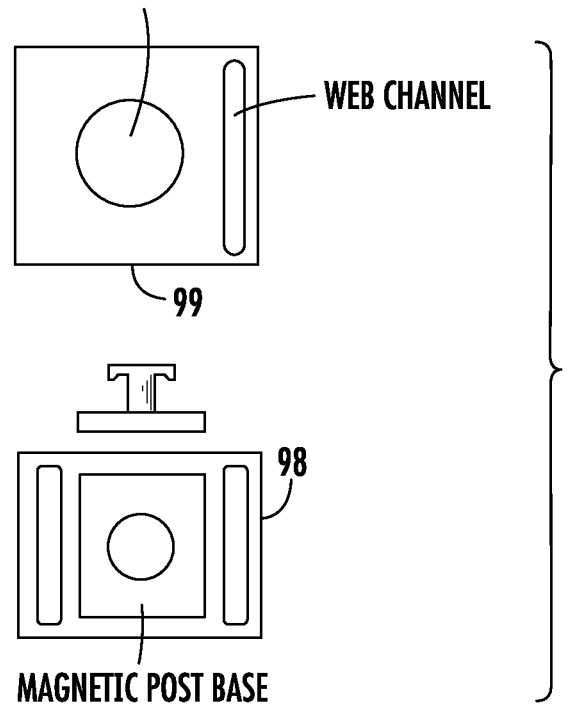
FIG. 13B shows another modified receiver which can used on a tool belt.

FIG. 13B illustrates an adjustable receiver 98 similar to the adjustable receiver 94 shown in FIG. 13A. In this embodiment the magnetic base is not raised from the body of the adjustable receiver 98 and the shape of the post cap is different from the rounded post cap of the adjustable receiver 94 in FIG. 13A. These differences accommodate the different conditions and purposes of the tool belt. The size and shape of the magnetic base of the FIG. 13B adjustable receiver 98 is suited for the flat metal rectangular catch 99 shown in the upper drawing of FIG. 13B. The rounded post cap of the adjustable receiver 94 in FIG. 13A permits the post to be centered in the opening of the catch 95 more easily as compared to a post cap which is flat (belonging to the adjustable receiver 98 of FIG. 13B). The catch 99 has a web channel to which tool straps may be attached.

Figure 13C:
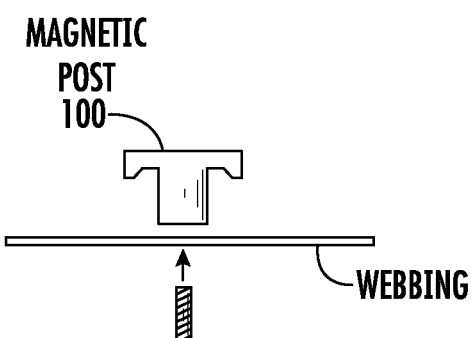
FIG. 13C shows the receiver can be modified to a magnetic post and rivet on a tool belt and a catch particularly adapted to FIG. 13B receiver and the FIG. 13C post and rivet.

FIG. 13C illustrates the reduction of the receiver to a magnetized post 100 and rivet 101. The post 100 passes through a tool belt and is fixed to the tool belt by the rivet 101. The post 100 has a flange lip extending around the top of the post to better engage the flat metal catch 99 of FIG. 13B. Furthermore, the thickness of the metal catch 99 might be increased for more contact area between the magnetized post and catch 99 for a more secure engagement of the tool to the belt.

Figure 14A:
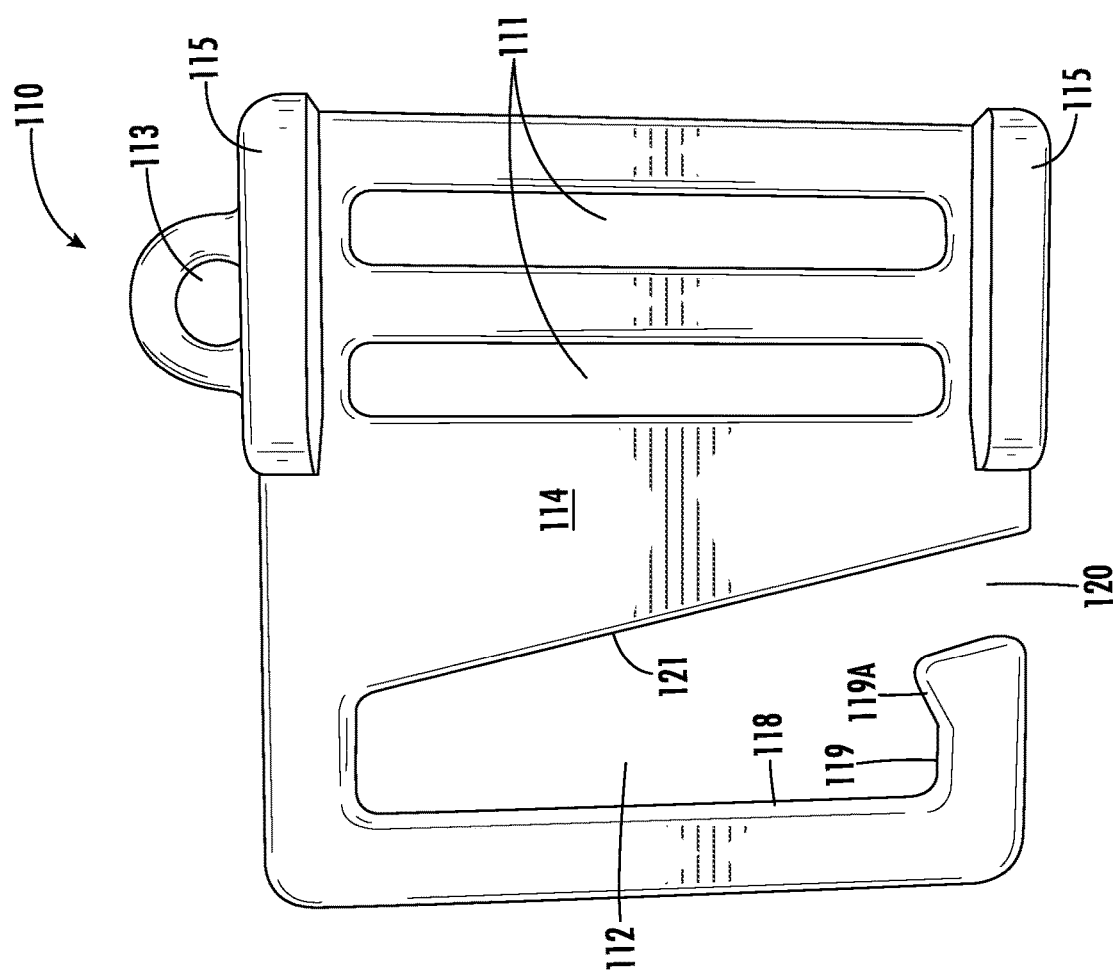
FIG. 14A shows a flat buckle modified with an opened hole in a top view.

The flat end buckle can also be modified. FIG. 14A shows a flat end buckle 110 in a top view. At one end of a generally flat metal body 114 there are two close and parallel slotted channels 111 for receiving a strap with a ladder lock. Side guards 115 protect the strap in the buckle 110. Near the slotted channels 111 is an opening 113 to receive a dog tag and the like. At the other end there is an opening 112 which is "open," i.e., the opening is not entirely enclosed by sidewalls with the flat body 114 and has a gap 120. The opening 112 receives a post in a corresponding receiver and the straight sidewall 118 of the opening indicates that the post is rectangular in a top view. The opposing sidewall 121 is angled to the gap 120, away from the parallel direction of the sidewall 118. At the gap 120 the side sidewall 119 which is contiguous and perpendicular to the sidewall 118 turns into the opening to form a hook with the sidewall portion 119A. The hook in the side sidewall 119 further secures engagement of the post in the opening 112. On the other hand, the gap 120 makes release of the post from the opening 112 easier by allowing the post to rotate away from the sidewall 118 and to escape through the gap 120.

Figure 14B:
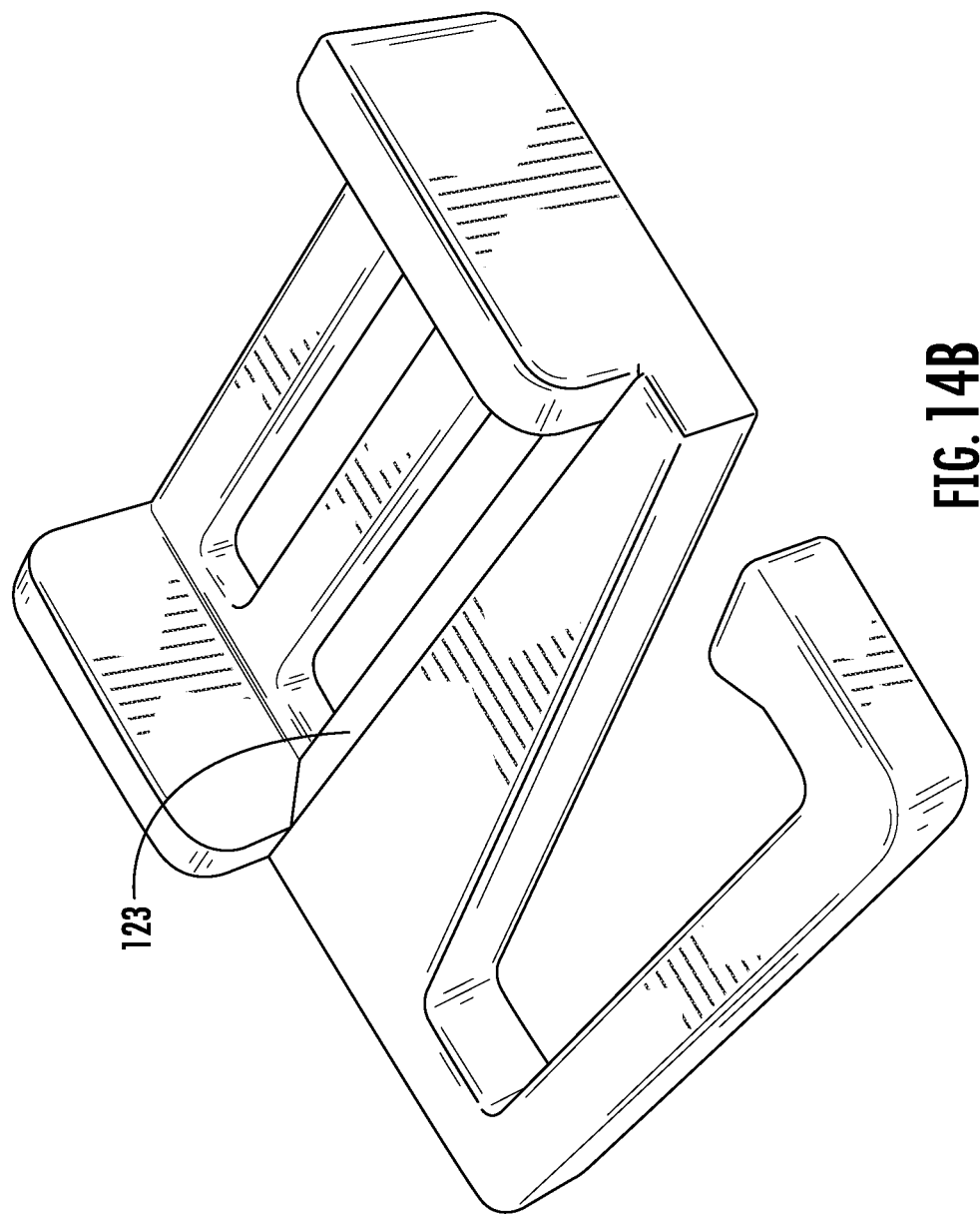
FIG. 14B shows the FIG. 14A flat buckle in a perspective view.
Figure 14C:
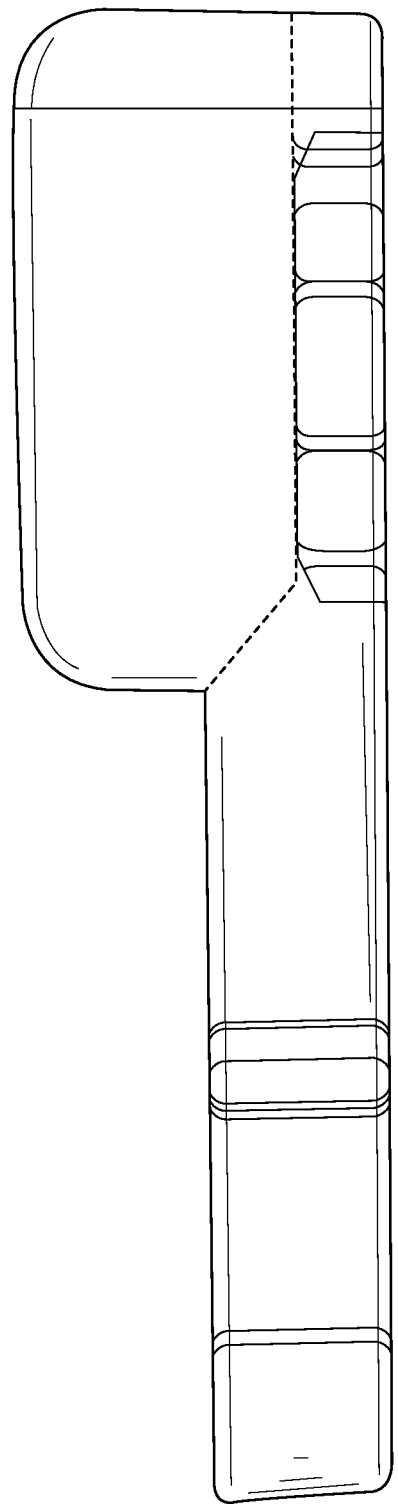
FIG. 14C shows the flat buckle in a side view.

The perspective view of FIG. 14B shows the teeth-edged surface 123 to one of the sidewalls 112. The edged surface 123 helps secure the strap in a ladder lock. The side view in FIG. 14C shows that the flat metal body 114 of the flat buckle 110 has two thicknesses; the part of the body holding the post opening 112 is twice as thick as the part of the body holding the slotted channels 111. In this particular embodiment, the body 114 is 4 mm at post opening 112 and 2 mm at slotted channels 111. The side guards 115 are 6 mm high. Furthermore, the slotted channels 111 are 25 mm long and 3 mm wide. The flat metal body 114 is rectangular in a top view, 32 mm wide and 32 mm long. These dimensions are for one particular embodiment of a flat end buckle and can change depending upon the purposes and uses of the buckle and its corresponding receiver. Note that these purposes and uses include the animal collar/leash previously described. And a flat end buckle might include only one slotted channel.

Figure 15A:
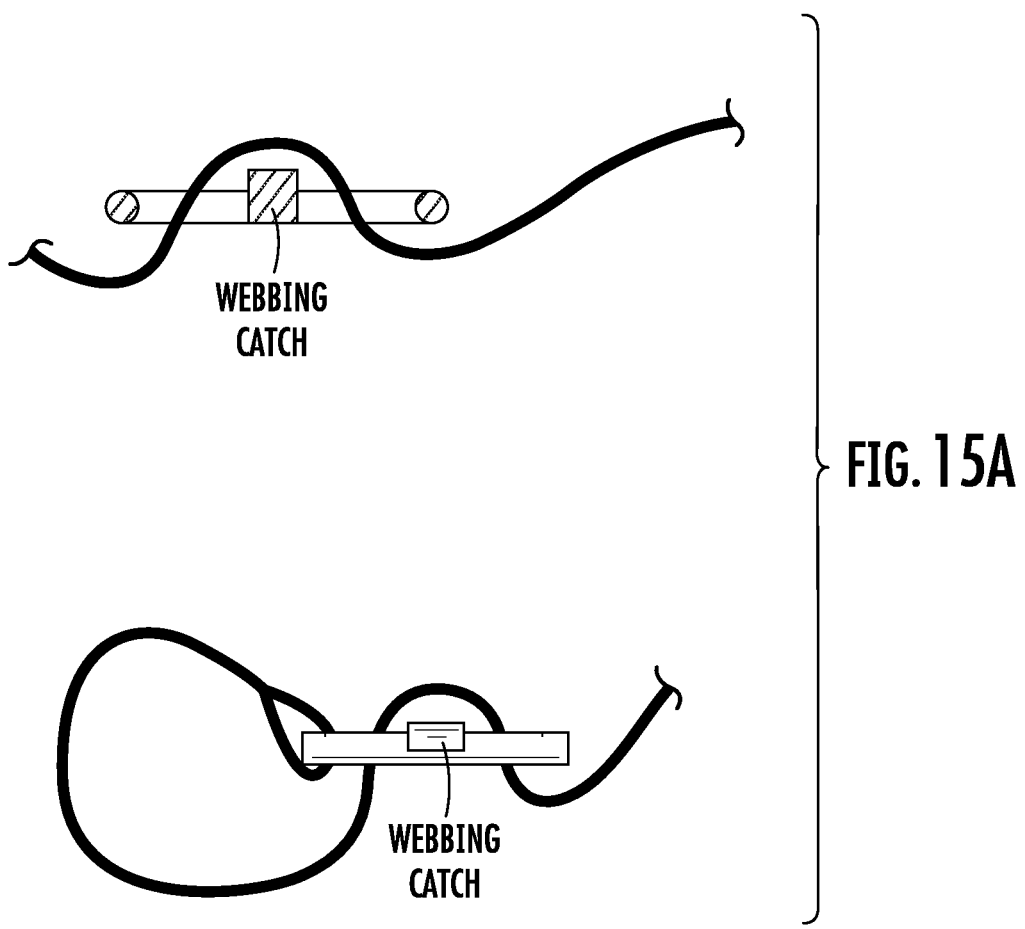

Finally, as illustrated in FIG. 15A another embodiment of the present invention provides a modified webbing catch which can form a secure loop with a strap or belt as a cargo strap, hammock strap and other uses. FIG. 15B shows that the catch has a rectangular frame with two ends connected by two side rails, and a pass swivel lock formed by a bar which can slide up and down the side rails. The pass swivel lock bar has one end which is connected to one of the side rails in such a manner than the lock bar can slide along the side rail and can rotate around the side rail. The other end of the pass swivel lock bar can slidably engage the second slide rail and can rotate away the second rail.

As shown in FIG. 15A, one of the ends of the strap or belt is attached to one of the catch frame ends, such as by stitching a small loop around the frame end. The two ends and two side rails are circular in diameter. The pass swivel lock bar is also circular with a diameter larger than that of the two sides and has an opening at the one bar end to accept a side rail. The opening is large enough so that the bar can rotate and slide along the one side bar. A groove located at the other end of pass swivel lock bar provides a secure contact with the other side when the catch is engaged. The bar is also knurled for a better "bite" into the webbing of the strap or belt.

FIG. 15C illustrates some steps in forming a secure loop with the strap. As shown in drawing (1), the pass swivel lock bar is opened and a loop of the strap is passed from below the catch frame. With the strap loop large enough, the pass swivel lock bar is lowered and closed as shown drawing (2). The strap loop now passes above the pass swivel lock bar. The strap is then pulled tight to secure the webbing of the strap between the pass swivel lock bar and the frame ends as shown in drawing (3). The connection is loosened by pulling the loop away from the pass swivel lock bar.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A belt arrangement comprising:
   a strap;
   a buckle having a flat metal body with at least one slotted opening through the flat metal body by which the buckle is attached to the strap, and a second opening through the flat metal body; and
   a receiver having a flat body having at least one slotted opening by which the receiver is attached to the strap, and a magnetic base for a post perpendicular to the flat body, the post and the second opening of the buckle each having straight sidewalls complementarily shaped to each other, wherein the post fits through the second opening of the buckle and substantially engages the sidewall of the second opening, and the magnetic base engages the flat metal body of the buckle, in a secure engagement of the metal buckle to the receiver;
   whereby the strap between the buckle and receiver can form a belt around a wearer.

2. The belt arrangement of claim 1 wherein the magnetic base is raised above the receiver flat body.

3. The belt arrangement of claim 1 wherein the magnetic base is level to the receiver flat body.

4. The belt arrangement of claim 1 wherein the post has a cap of flange lips, the flange lips engaging the flat buckle body to help the secure engagement of the metal buckle to the receiver.

5. The belt arrangement of claim 4 wherein the flange lips extend around the post.

6. The belt arrangement of claim 4 wherein the flange lips extend in a direction toward the sidewall of the second opening in a secure engagement of the metal buckle to the receiver.

7. The belt arrangement of claim 1 wherein the receiver has a single slotted opening by which the receiver is connected to a first end of the strap, and the buckle has two close slotted openings by which the buckle is attached to the strap at an adjustable position and the position is fixed along the strap by a ladder lock with the two close slotted openings.

8. The belt arrangement of claim 1 wherein the buckle has a single slotted opening by which the buckle is connected to a first end of the strap, and the receiver has two slotted openings by which the receiver is attached to the strap at an adjustable position and the position is fixed along the strap by a ladder lock with the two slotted openings.

* * * * *